US012572380B2

(12) United States Patent
Park et al.

(10) Patent No.: US 12,572,380 B2
(45) Date of Patent: *Mar. 10, 2026

(54) CONTROL DEVICE, SYSTEM ON CHIP, AND ELECTRONIC DEVICE

(71) Applicant: Samsung Electronics Co., Ltd.,
Suwon-si (KR)

(72) Inventors: Chung Woo Park, Hwaseong-si (KR);
Gang Li, Hwaseong-si (KR); Bo Youn Park, Seoul (KR); Ji Woong Hwang,
Incheon (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 382 days.

This patent is subject to a terminal disclaimer.

(21) Appl. No.: 17/949,381

(22) Filed: Sep. 21, 2022

(65) Prior Publication Data

US 2023/0087153 A1     Mar. 23, 2023

Related U.S. Application Data

(63) Continuation-in-part of application No. 17/716,442, filed on Apr. 8, 2022.

(30) Foreign Application Priority Data

Sep. 17, 2021    (KR) ........................ 10-2021-0124651

(51) Int. Cl.
*G06F 9/48* (2006.01)
*G06F 9/4401* (2018.01)
*G06F 9/455* (2018.01)

(52) U.S. Cl.
CPC ........ *G06F 9/4812* (2013.01); *G06F 9/45558* (2013.01); *G06F 9/4418* (2013.01); *G06F 2009/45562* (2013.01)

(58) Field of Classification Search
CPC ..... G06F 9/4865; G06F 9/5077; G06F 9/4812
See application file for complete search history.

(56) References Cited

U.S. PATENT DOCUMENTS 6,269,391 B1 *   7/2001  Gillespie ............... G06F 9/4881
                                                            718/100
9,971,616 B2 *   5/2018  Kaul .................... G06F 9/45558
(Continued)

FOREIGN PATENT DOCUMENTS

KR      10-1997-0016889       4/1997
KR      10-2004-0095547  A   11/2004
(Continued)

OTHER PUBLICATIONS

Written Decision on Registration issued Nov. 27, 2023 in Korean Application No. 10- 2022-0104745.
(Continued)

*Primary Examiner* — Lewis A Bullock, Jr.
*Assistant Examiner* — Jordan Scott Motter
(74) *Attorney, Agent, or Firm* — Harness, Dickey & Pierce, P.L.C.

(57) ABSTRACT

A control device comprises a plurality of processor clusters, and a controller including memory device, wherein the controller is configured to generate a first virtual machine and a second virtual machine different from the first virtual machine, wherein a first operation is performed by using the first virtual machine and a second operation different from the first operation is performed by using the second virtual machine on the plurality of processor clusters, wherein the second operation is stopped by a suspend operation for the second virtual machine and data for the second virtual machine is stored in the memory device, wherein the first operation is stopped by a suspend operation for the first virtual machine and data for the first virtual machine is stored in the memory device, wherein the second operation
(Continued)

START

S514 — Sleep Mode

S521 — Resume HV

S540 — Domain change? N

S541 — Normal mode? Y

S544 — Resume VM1 & VM2

S545 — VM1 & VM2 work

N S542 — Resume VM1

S543 — VM1 work

S523 — Resume VM2

S524 — VM2 work

S525 — Receive VM1 resume interrupt? N

S526 — Suspend VM2

S527 — Resume VM1 and normal mode

END is performed by a resume operation for the second virtual machine while the first operation is being stopped.

20 Claims, 23 Drawing Sheets

(56) References Cited

U.S. PATENT DOCUMENTS

| | | | | |
|---|---|---|---|---|
| 10,162,665 | B1 * | 12/2018 | Eidelman | G06F 9/45558 |
| 10,289,437 | B2 * | 5/2019 | van Riel | G06F 1/3287 |
| 10,365,936 | B2 | 7/2019 | van Riel et al. | |
| 10,445,123 | B2 | 10/2019 | Deguillard et al. | |
| 10,459,444 | B1 | 10/2019 | Kentley-Klay | |
| 10,503,237 | B2 | 12/2019 | Surdu | |
| 2009/0241189 | A1 * | 9/2009 | Shanbhogue | G06F 13/26 |
| | | | | 726/23 |

| | | | | |
|---|---|---|---|---|
| 2014/0223435 | A1 * | 8/2014 | Chang | G06F 9/45558 |
| | | | | 718/1 |
| 2016/0048405 | A1 * | 2/2016 | Lang | G06F 9/45558 |
| | | | | 718/1 |
| 2018/0049156 | A1 * | 2/2018 | Laha | H04W 76/28 |
| 2020/0089484 | A1 | 3/2020 | Broas et al. | |
| 2021/0225096 | A1 | 7/2021 | Dong et al. | |

FOREIGN PATENT DOCUMENTS

| | | |
|---|---|---|
| KR | 10-2008-0020639 A | 3/2008 |
| KR | 10-2009-0098812 A | 9/2009 |
| KR | 10-2016-0055919 A | 5/2016 |
| KR | 10-2020-0110229 A | 9/2020 |

OTHER PUBLICATIONS

Request for the Submission of an Opinion issued Jun. 30, 2023 in Korean Application No. 10-2022-0104745.

* cited by examiner

FIG. 2

START

S500 — Booting electronic device

S501 — Load hypervisor on the memory

S502 — Excute hypervisor

S503 — Generate VM1 and VM2 using hypervisor

S504 — Perform operations with VM1 and VM2

END

Figure 12:
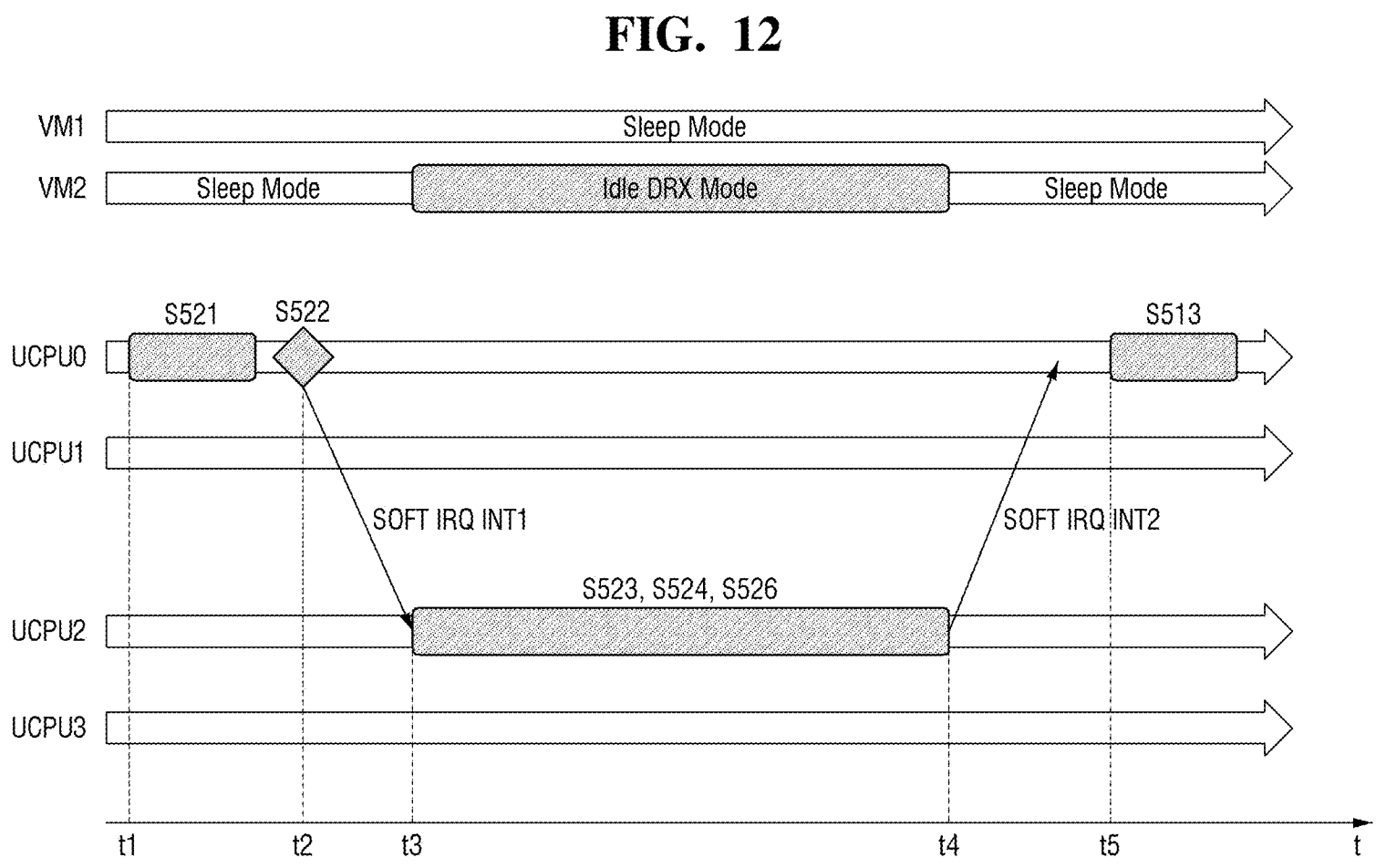

VM1    Sleep Mode

VM2    Sleep Mode    Idle DRX Mode    Sleep Mode

UCPU0    S521    S522    SOFT IRQ INT1    S513

UCPU1

UCPU2    S523, S524, S526    SOFT IRQ INT2

UCPU3 t1    t2    t3    t4    t5    t

FIG. 14

Measured Power Data

Figure 23:
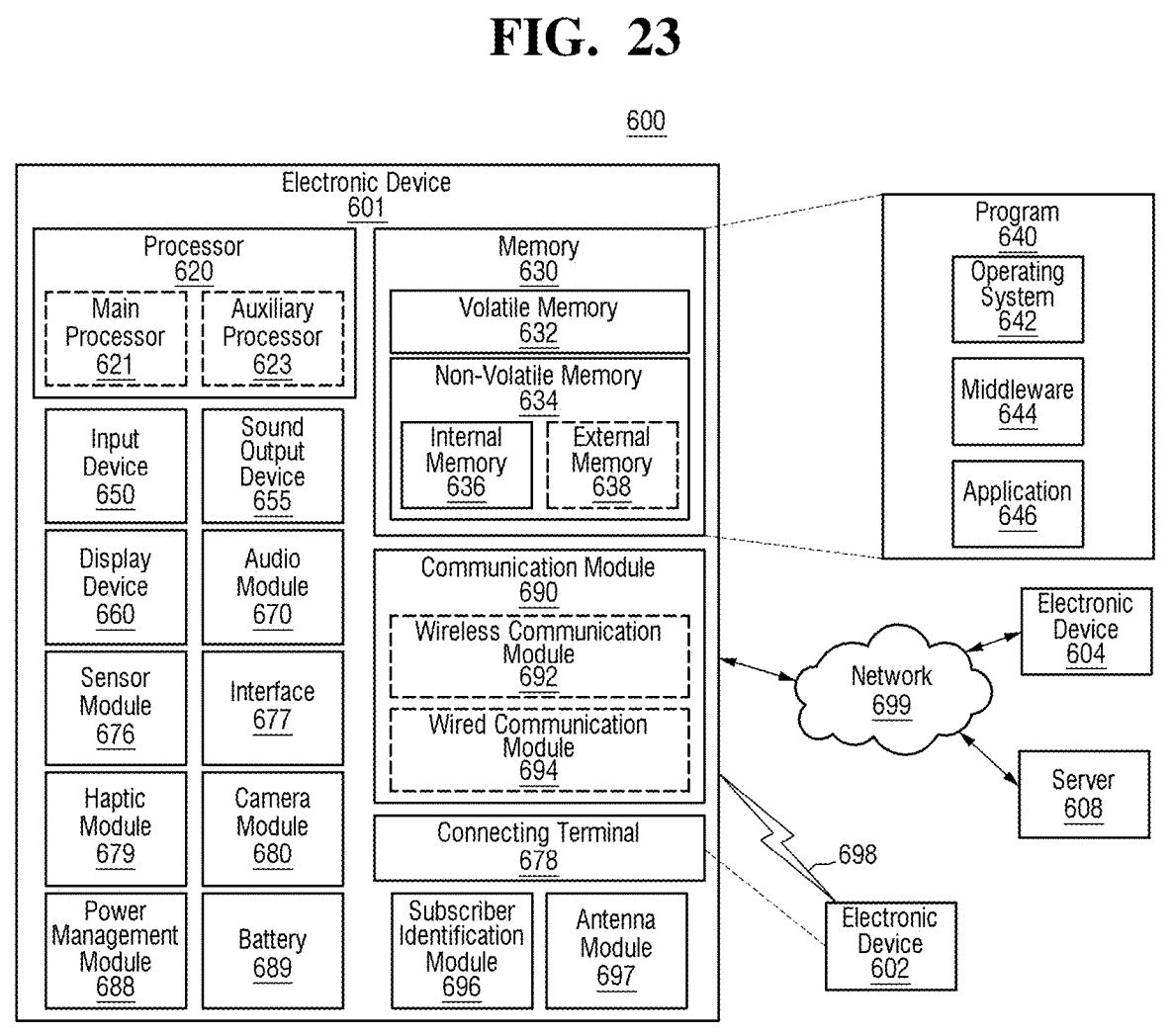

Electronic Device 601

Memory 630
- Volatile Memory 632
- Non-Volatile Memory 634
  - Internal Memory 636
  - External Memory 638

Program 640
- Operating System 642
- Middleware 644
- Application 646

Processor 620
- Main Processor 621
- Auxiliary Processor 623

Input Device 650

Sound Output Device 655

Display Device 660

Audio Module 670

Sensor Module 676

Interface 677

Camera Module 680

Haptic Module 679

Battery 689

Power Management Module 688

Communication Module 690
- Wireless Communication Module 692
- Wired Communication Module 694

Connecting Terminal 678

Subscriber Identification Module 696

Antenna Module 697

Network 699

Electronic Device 604

Server 608

Electronic Device 602

698

CONTROL DEVICE, SYSTEM ON CHIP, AND ELECTRONIC DEVICE

CROSS-REFERENCE TO RELATED APPLICATION

This application is a continuation-in-part of U.S. application Ser. No. 17/716,442, filed on Apr. 8, 2022, which claims priority from Korean Patent Application No. 10-2021-0124651 filed on Sep. 17, 2021 in the Korean Intellectual Property Office and all the benefits accruing therefrom under 35 U.S.C. 119, the contents of which in its entirety are herein incorporated by reference.

BACKGROUND

Technical Field

The present disclosure relates to a control device, system on chip and electronic device.

Description of the Related Art

A system on chip may include a processor for controlling a semiconductor device connected thereto. The processor of the system on chip may perform computation and control an operation of the semiconductor device by transmitting and receiving signals. In some cases, the system on chip may include a plurality of processors and may consume a large amount of power when performing the operation of the semiconductor device.

The system on chip may power off the processor(s) when the semiconductor device or an electronic device including the semiconductor device does not perform any operation, (i.e., in the case of a sleep mode) to reduce power consumption.

SUMMARY

Example Embodiments provide a control device that reduces power consumption and has improved performance.

Example embodiments provide a system on chip that reduces power consumption and has improved performance.

Other example embodiments provide an electronic device that reduces power consumption and has improved performance.

Example embodiments are not limited to those mentioned above and additional embodiments of the present disclosure, which are not mentioned herein, will be clearly understood by those skilled in the art from the following description of the present disclosure.

According to an example embodiment, there is provided control device comprising a plurality of processor clusters, and a controller including memory device, wherein the controller is configured to generate a first virtual machine and a second virtual machine different from the first virtual machine, wherein a first operation is performed by using the first virtual machine and a second operation different from the first operation is performed by using the second virtual machine on the plurality of processor clusters, wherein the second operation is stopped by a suspend operation for the second virtual machine and data for the second virtual machine is stored in the memory device, wherein the first operation is stopped by a suspend operation for the first virtual machine after stopping the second operation and data for the first virtual machine is stored in the memory device, wherein the second operation is performed by a resume operation for the second virtual machine while the first operation is being stopped.

According to an example embodiment, there is provided system on chip comprising a controller, a first processor cluster, and a second processor cluster, wherein the controller is configured to generate a first virtual machine and a second virtual machine different from the first virtual machine, in a normal mode, the first processor cluster is configured to perform a first operation by using the first virtual machine and the second processor cluster is configured to perform a second operation different from the first operation by using the second virtual machine, in a sleep mode, the first processor cluster is configured to not perform the first operation and the second processor cluster is configured to not perform the second operation, and in an idle discontinuous reception DRX mode, the first processor cluster is configured to not perform the first operation and the second processor is configured to perform the second operation.

According to an example embodiment, there is provided electronic device comprising a control device including first and second processor clusters and a memory device, wherein the control device is configured to generate a first virtual machines and a second virtual machine, which are different from each other, by using a hypervisor stored in the memory device, not perform a control operation by using the first virtual machine and the first processor cluster and perform communication with an external device by using the second virtual machine and the second processor cluster, in a first mode, and perform the control operation by using the first virtual machine and the first processor cluster in response to an interrupt from the external device, and switch the first mode to a second mode.

BRIEF DESCRIPTION OF DRAWINGS

The above and other aspects and features of the present disclosure will become more apparent by describing in detail exemplary embodiments thereof with reference to the attached drawings, in which:

FIG. 2 is a block diagram illustrating some example embodiments of the control device of FIG. 1.

FIG. 11 is a diagram illustrating a control device in an idle DRX mode.

FIG. 12 is a diagram illustrating operations of CPUs according to some example embodiments.

FIGS. 13 and 14 are diagrams illustrating a DRX mode.

Figure 15:
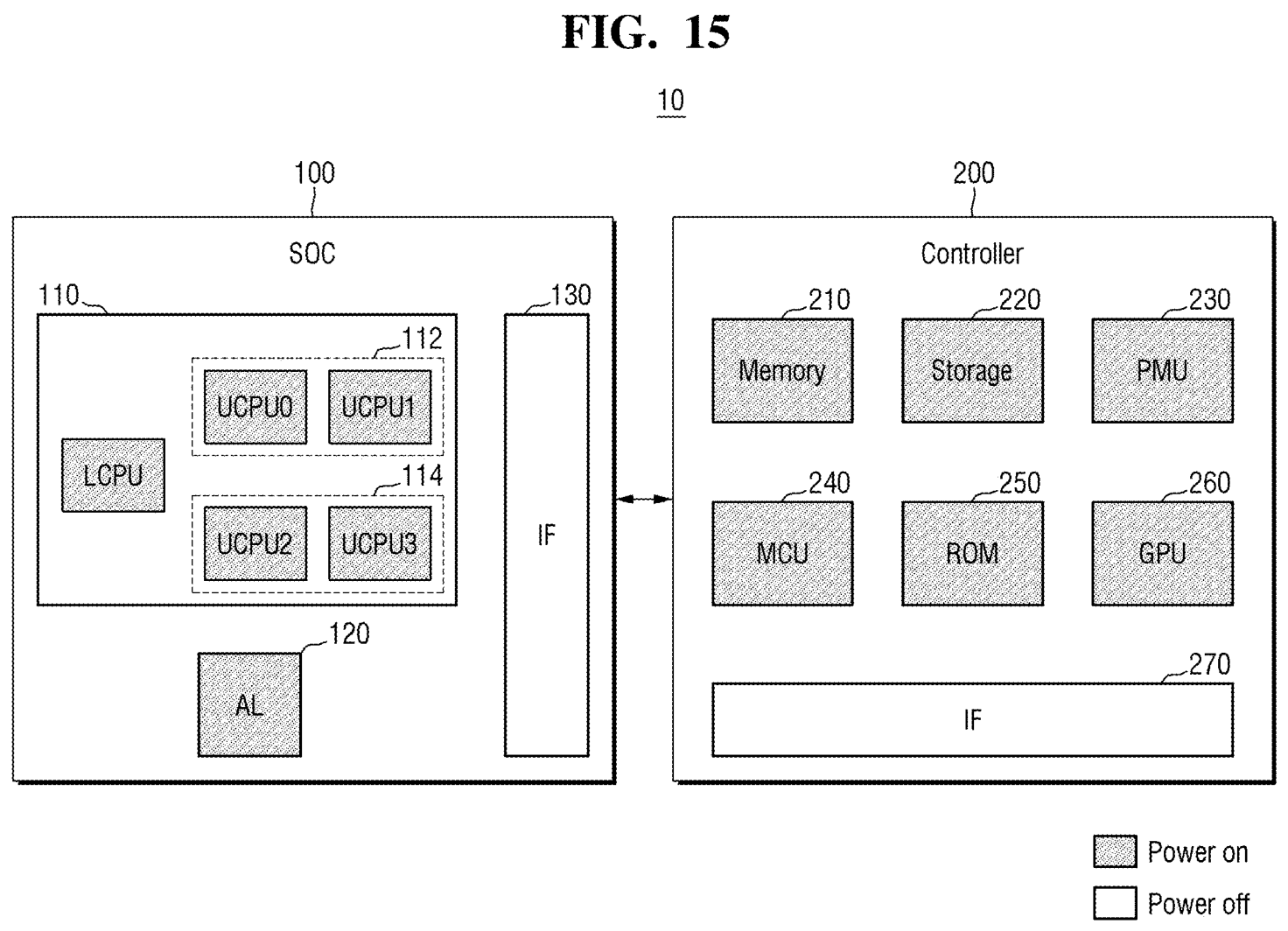

FIG. 15 is a diagram illustrating a control device in a normal mode.

Figure 16:
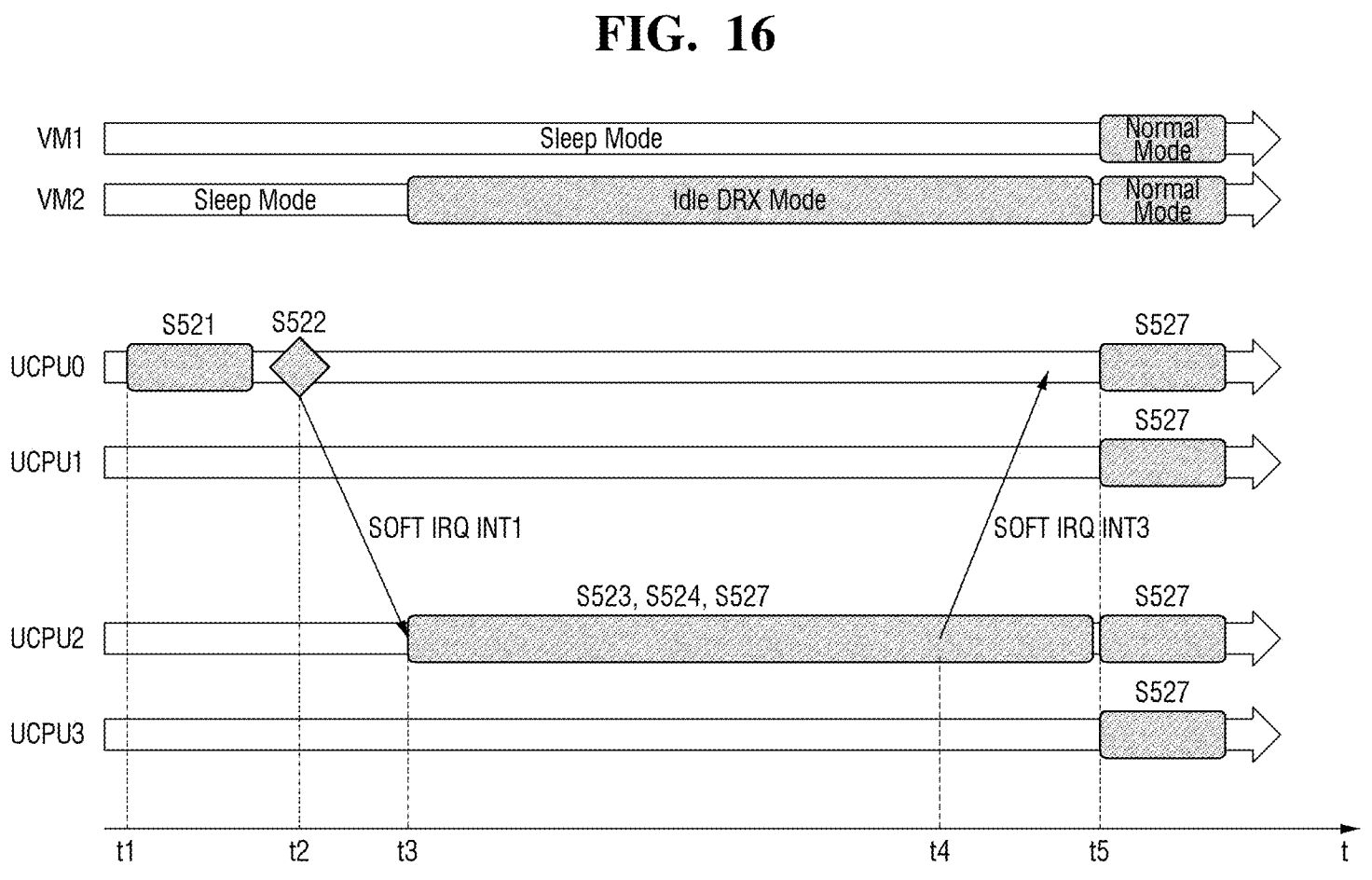

FIG. 16 is a diagram illustrating operations of CPUs according to some example embodiments.

Figure 17:
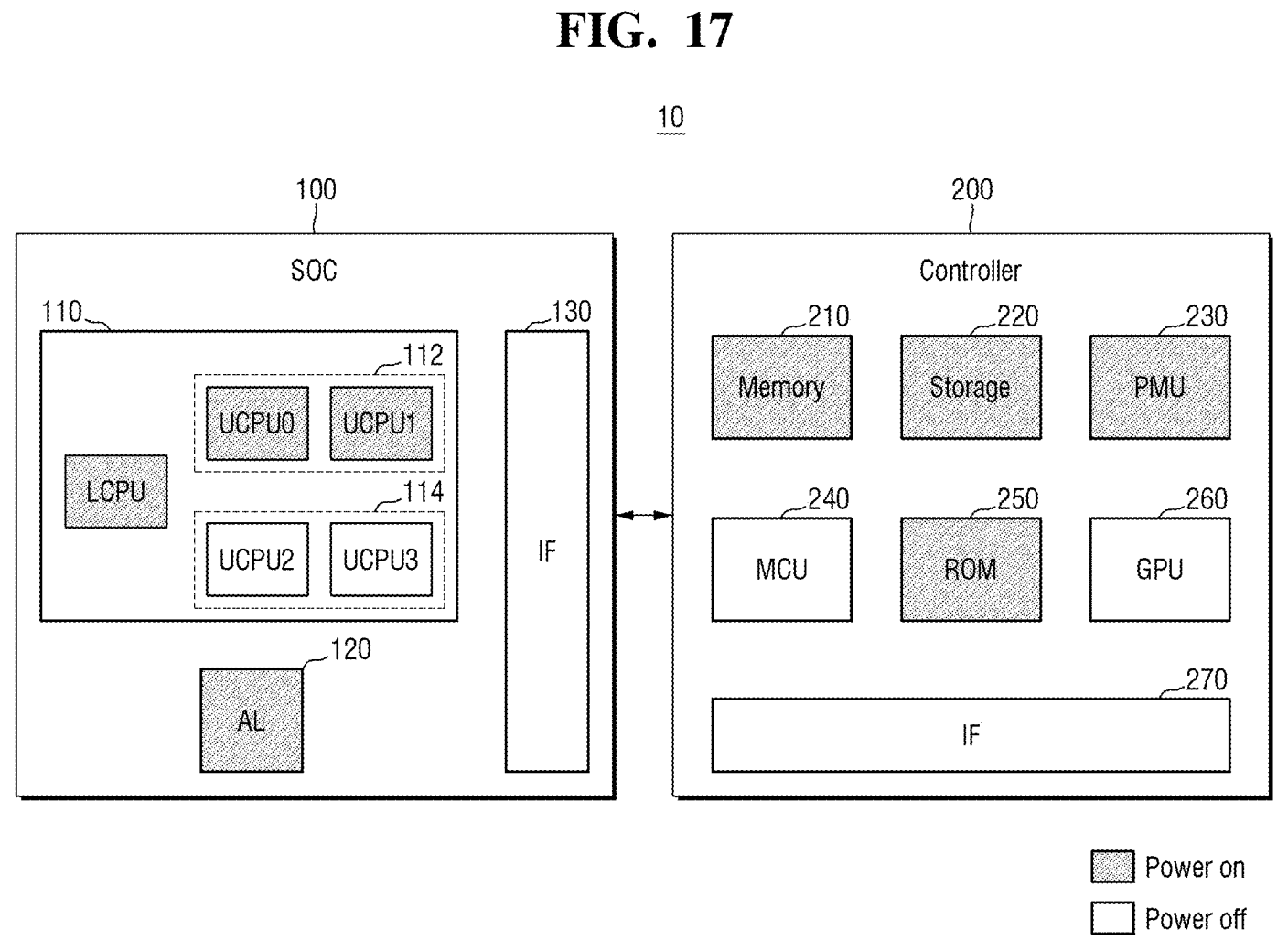

FIG. 17 is a diagram illustrating a control device according to some example embodiments.

Figure 18:
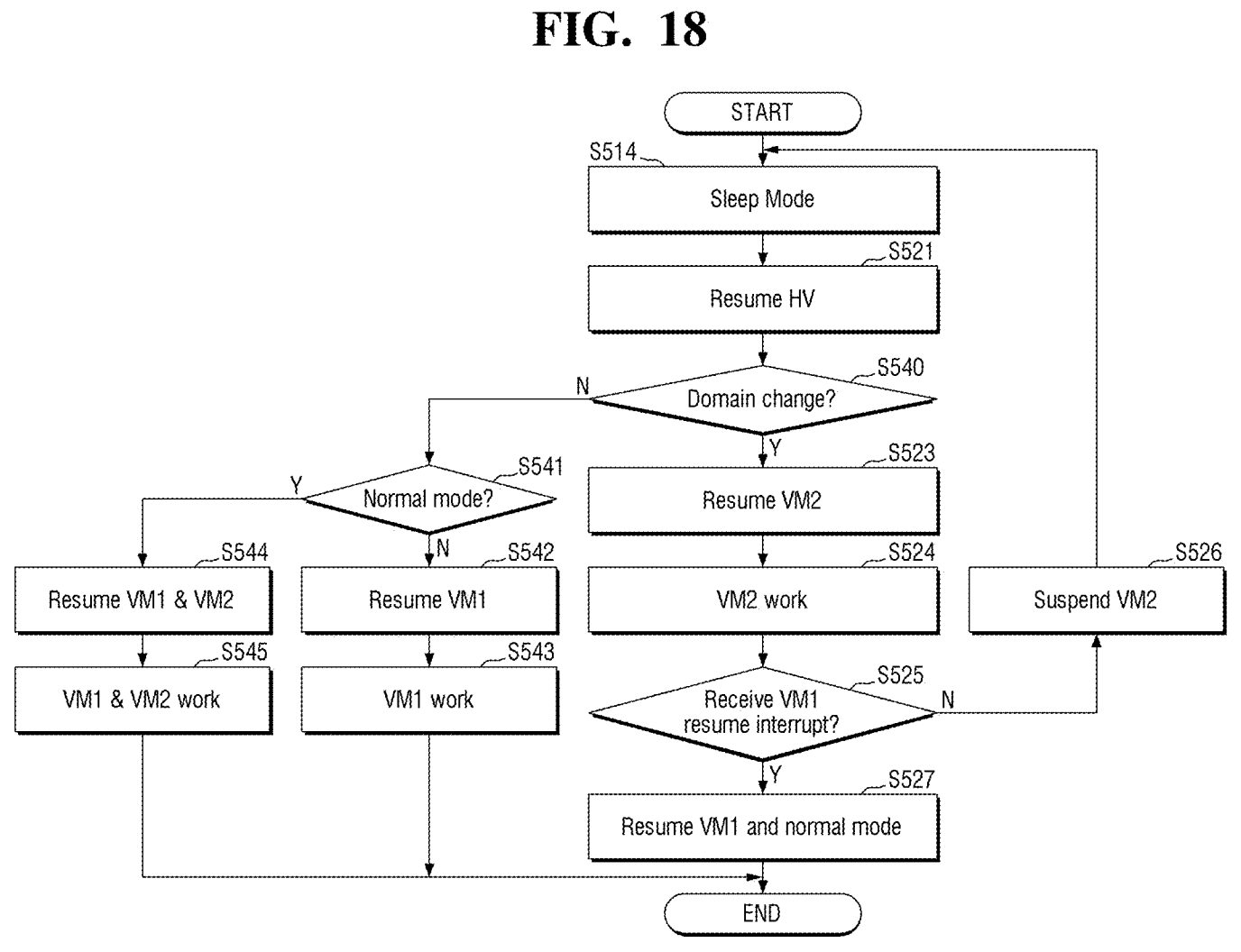

FIG. 18 is a flow chart illustrating a resume operation of a control device according to some example embodiments.

Figure 19:
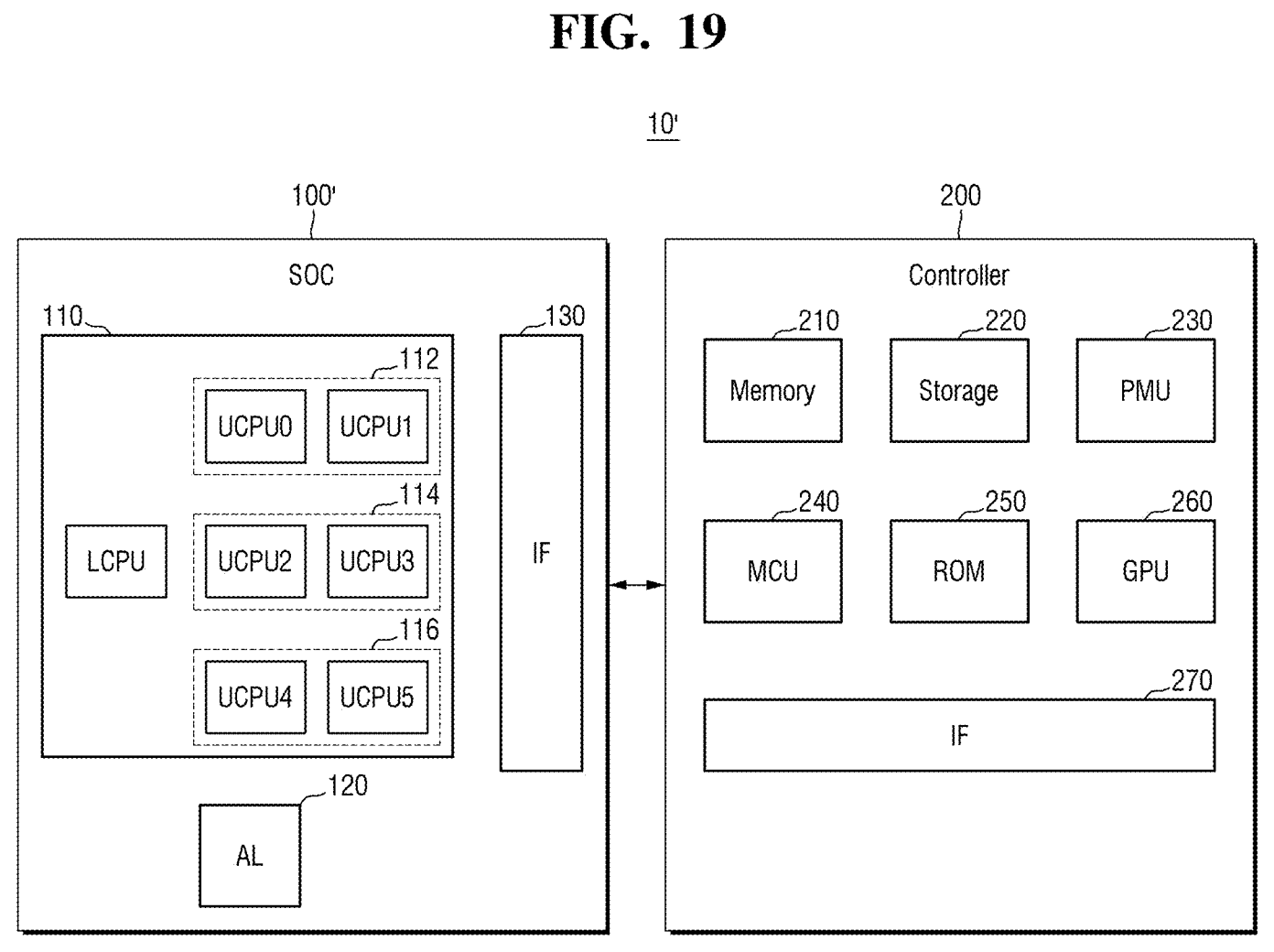

FIG. 19 is a diagram illustrating a control device according to some example embodiments.

Figure 20:
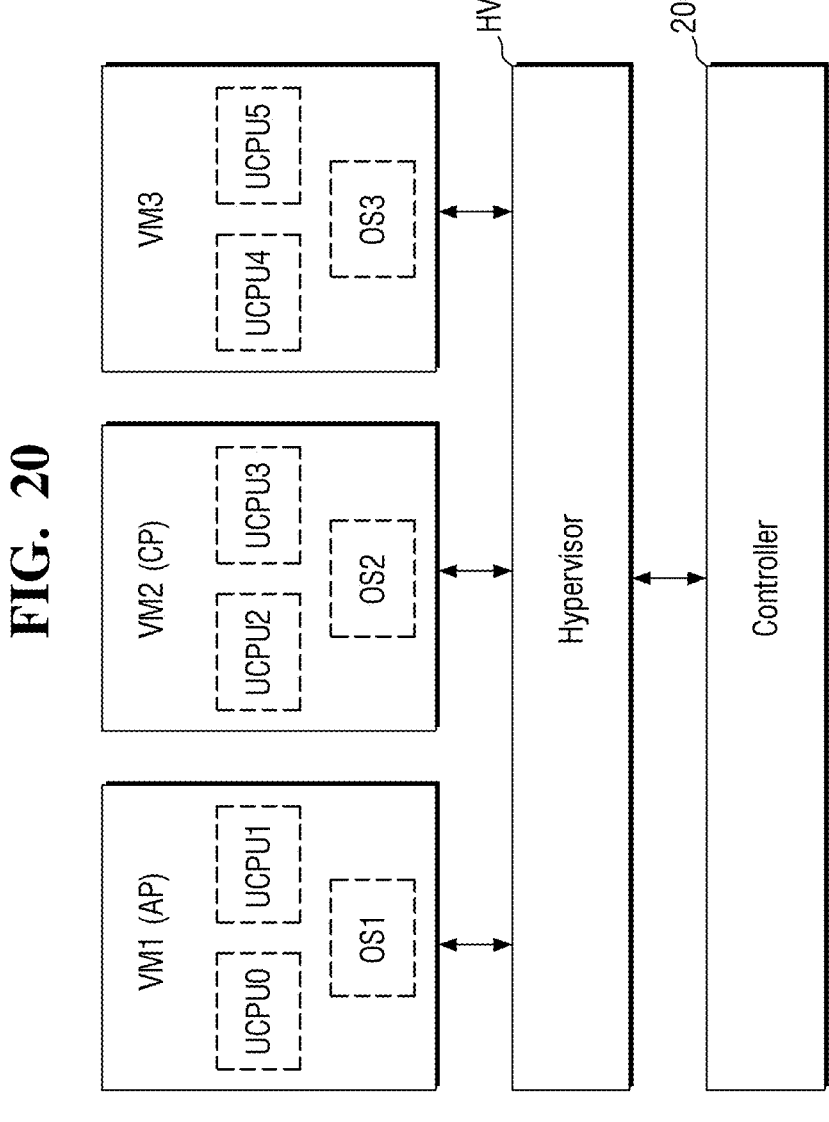

FIG. 20 is a diagram illustrating an operation of a control device according to some example embodiments.

Figure 21:
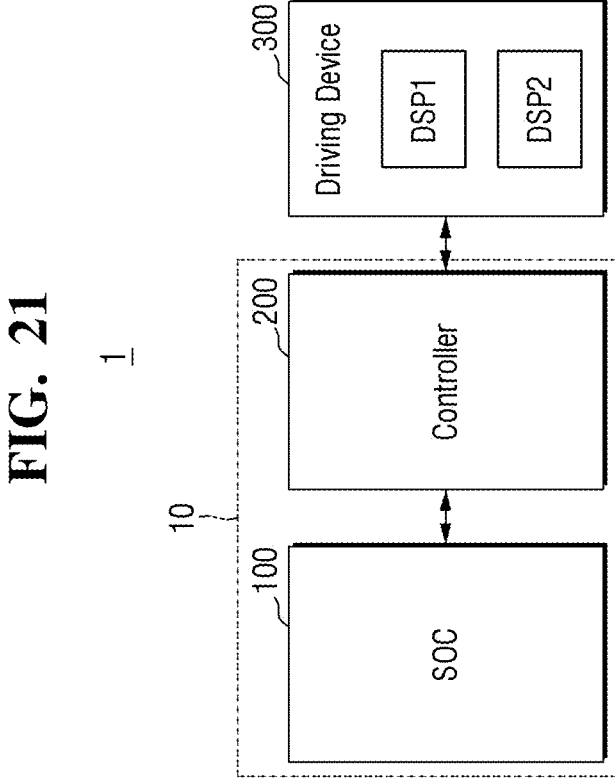

FIG. 21 is a diagram illustrating an electronic device according to some example embodiments.

Figure 22:
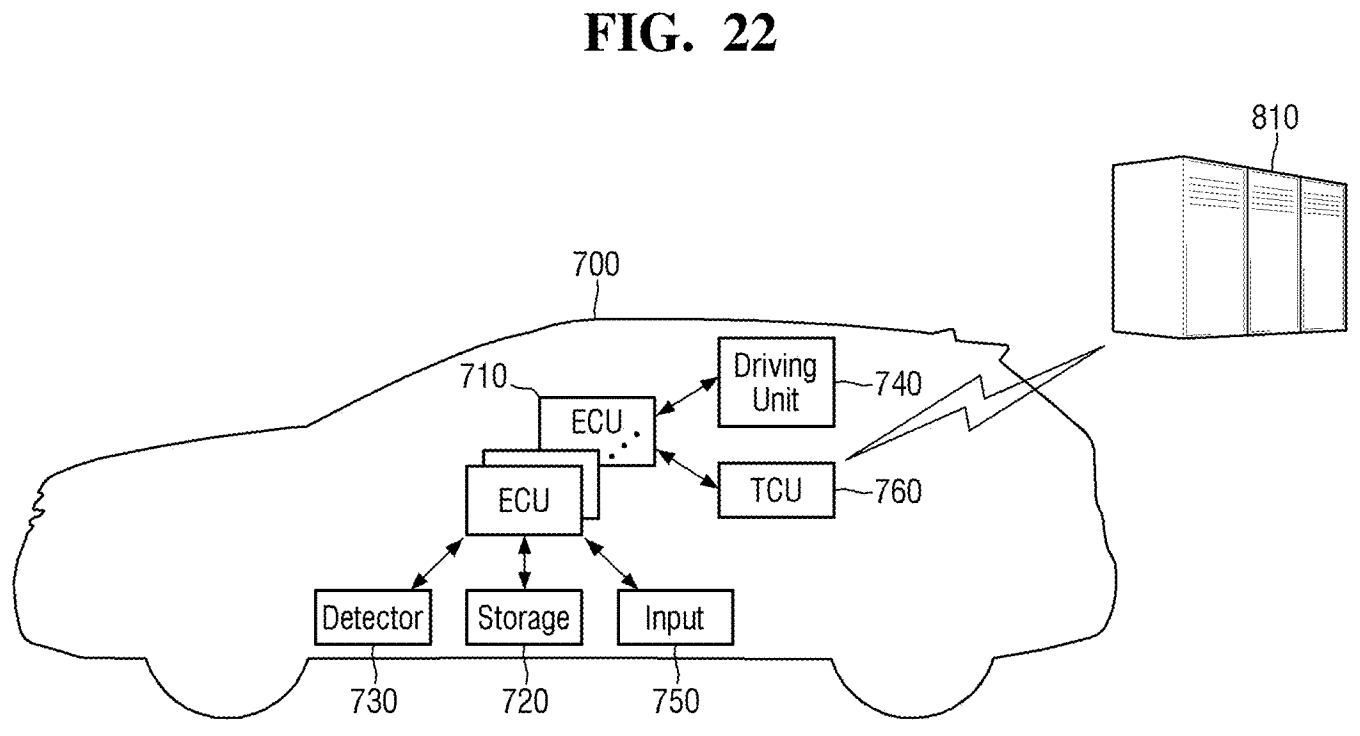

FIG. 22 is a diagram illustrating a vehicle, which includes an electronic control device, according to some example embodiments.

FIG. 23 is a block diagram of the electronic device according to some embodiments.

DETAILED DESCRIPTIONS

Hereinafter, embodiments according to the technical idea of the present disclosure will be described with reference to the accompanying drawings.

Figure 1:
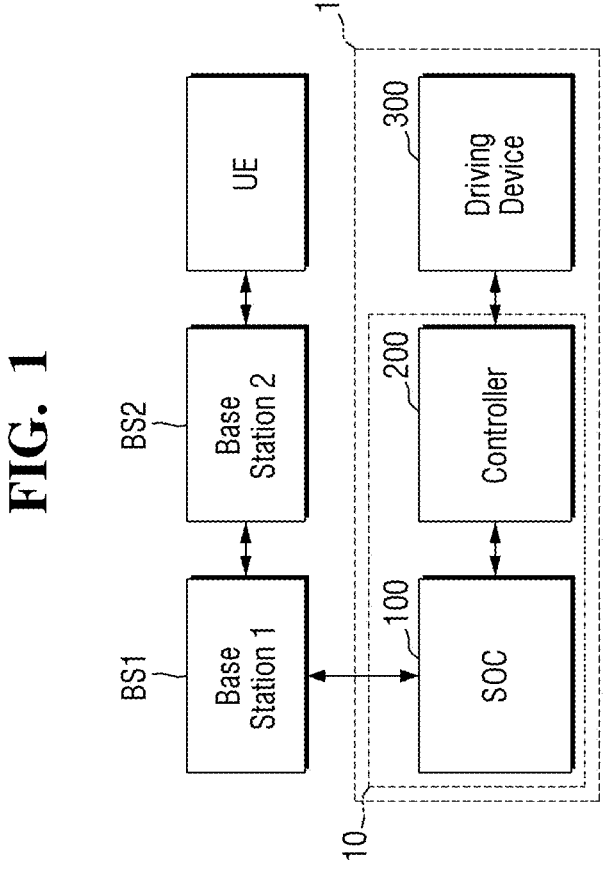
FIG. 1 is a block diagram illustrating an electronic device according to some example embodiments.

Referring to FIG. 1, an electronic device 1 may include a control device 10 and a driving device 300. The control device 10 may be connected to the driving device 300 to control the driving device 300. In this case, the driving device 300 may drive the electronic device 1. For example, when the electronic device 1 is a vehicle, the driving device 300 may include a device for performing driving, a display device for displaying an operation status, and the like. However, the embodiments of the present disclosure are not limited to this example, and the driving device 300 may control other electronic devices.

The control device 10 may include a system on chip (SOC) 100 and a controller 200. The system on chip 100 may be connected with the controller 200. The controller 200 may be connected to the driving device 300 and may control the driving device 300. For example, the controller 200 may maintain an operation of the driving device 300 to be optimized. The system on chip 100 may be connected to the controller 200 to perform computation. That is, the system on chip 100 and the controller 200 may perform communication by transmitting and receiving signals. For example, the system on chip 100 may process data from the controller 200 and then provide the processed data back to the controller 200. In addition, the system on chip 100 may process data from an external device and then provide the processed data back to the controller 200. In addition, the system on chip 100 may control the driving device 300 together with the controller 200. In the present embodiment, although the control device 10 is shown as including the system on chip 100 and the controller 200, the controller 200 may be represented by the system on chip 100. That is, components of the controller 200 may be included in the system on chip 100.

The electronic device 1 may perform communication with a first base station BS1. For example, the control device 10 may perform communication with the first base station BS1 through an antenna. In addition, the first base station BS1 may be connected with a second base station BS2, and the second base station BS2 may be connected with a user equipment UE. That is, the user equipment UE and the electronic device 1 may perform communication through the first base station BS1 and the second base station BS2. For example, communication between the electronic device 1 and the user equipment UE may correspond to wireless communication.

In some example embodiments, the user equipment UE may transfer a signal to the electronic device 1. The control device 10 may receive the signal from the user equipment UE through an antenna. For example, the control device 10 may receive an interrupt and perform an operation in response to the interrupt. That is, the control device 10 may perform a communication operation. However, the embodiments of the present disclosure are not limited to this example, and the control device 10 may also perform a computation operation as well as the communication operation.

Figure 2:
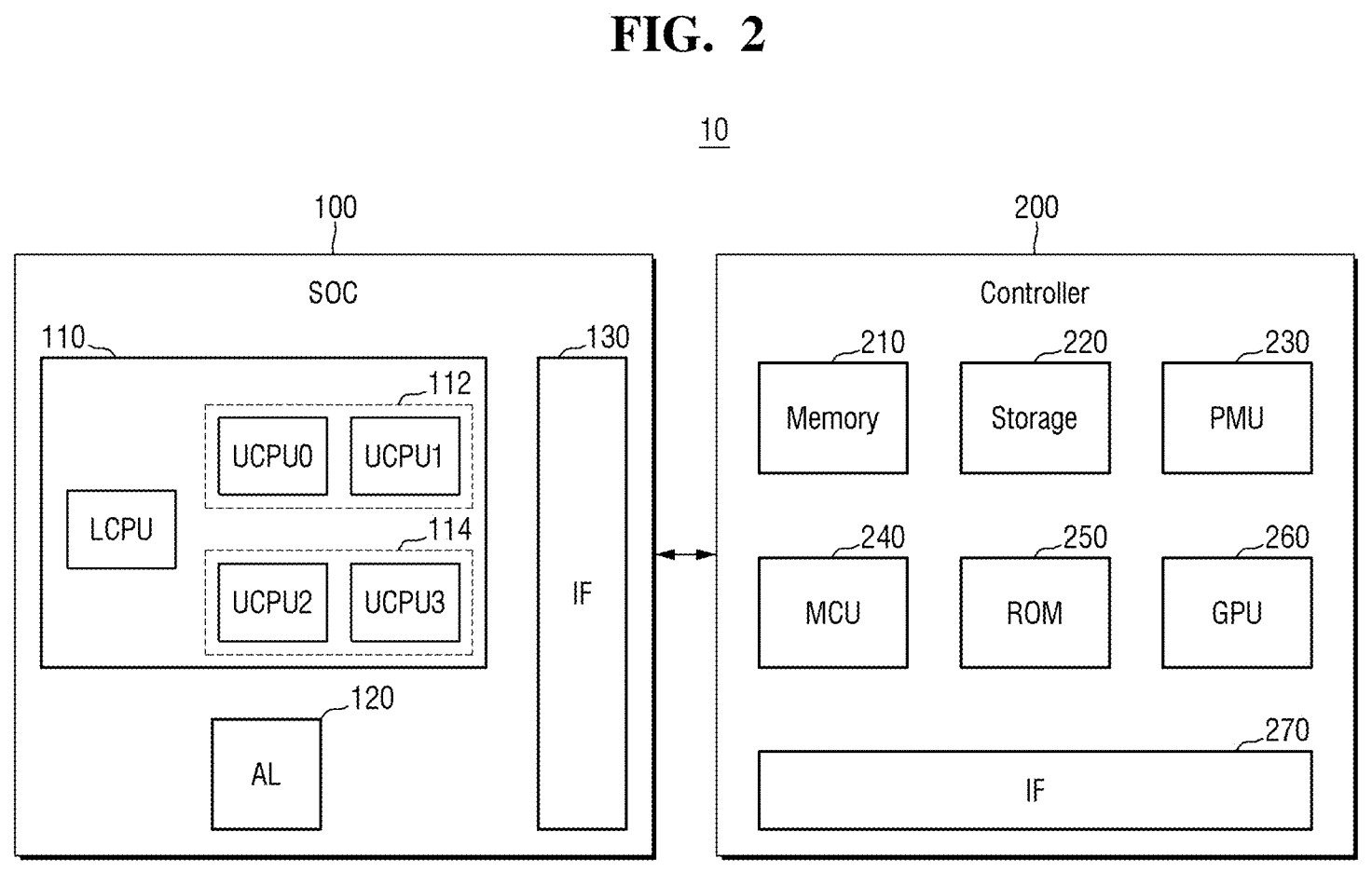

FIG. 2 is a block diagram illustrating some example embodiments of the control device of FIG. 1.

Referring to FIG. 2, the control device 10 may include a system on chip 100 and a controller 200. The system on chip 100 may include a processor cluster 110, an alive module (AL) 120 and an interface (IF) 130. The controller 200 may include a memory device 210, a storage device 220, a power manager (PMU) 230, a driving device controller (MCU) 240, a read-only memory (ROM) 250, a GPU 260, and an interface (IF) 270.

The processor cluster 110 may include a plurality of processors. For example, the processor cluster 110 may include a first sub-processor cluster 112, a second sub-processor cluster 114, and a communication CPU LCPU. In this case, the first sub-processor cluster 112 may include a (0)th CPU UCPU0 and a first CPU UCPU1, and the second sub-processor cluster 114 may include a second CPU UCPU2 and a third CPU UCPU3. The (0)th to third CPUs UCPU0 to UCPU3 and the communication CPU LCPU may operate independently and may be powered on or powered off independently. The first sub-processor cluster 112, the second sub-processor cluster 114 and the communication CPU LCPU may be attached onto a main board of the system on chip 100.

The first sub-processor cluster 112 may perform a computation operation for data from the controller 200. That is, the first sub-processor cluster 112 may operate as an application processor AP. The (0)th CPU UCPU0 of the first sub-processor cluster 112 may generally control and perform the computation operation of the first sub-processor cluster 112.

The second sub-processor cluster 114 may perform a computation operation for data from the controller 200 and data from an external device. The communication CPU LCPU may receive and process a signal from the external device by using an antenna. The communication CPU LCPU may provide the processed data to the second sub-processor cluster 114. The second sub-processor cluster 114 may perform a computation operation for the data from the communication CPU LPCU. That is, the second sub-processor cluster 114 may operate as a communication processor CP. The second CPU UCPU2 of the second sub-processor cluster 114 may generally control and perform the computation operation of the second sub-processor cluster 114. The communication CPU LCPU and the second sub-processor cluster 114 may logically be distinguished but may not be distinguished physically.

That is, the system on chip 100 may perform functions of the application processor and the communication processor. However, in the embodiments of the present disclosure, each CPU is not limited to performing only the corresponding function. For example, the (0)th CPU UCPU0 and the first CPU UCPU1 may perform the function of the communication processor, and the second CPU UCPU2 and the third CPU UCPU3 may perform the function of the application processor. That is, a specific processor of the system on chip 100 is not limited to performing a specific function. An internal configuration of the system on chip 100 is not limited to the shown example of FIG. 2.

The alive module 120 may correspond to a module that performs an operation for the system on chip 100 in a sleep mode. The alive module 120 may include a CPU. When the system on chip 100 is in the sleep mode, the processor cluster 110 may be powered off. At this time, the CPU of the alive module 120 may transmit and receive data to and from the external device or the controller 200 and may process the data. That is, as the alive module 120 is used, a minimum power may be used in the sleep mode. The interface 130 may connect the system on chip 100 with the controller 200.

The processor 110 and component sub-processors may operate by executing instructions stored in the memory device 210, read only memory 250, storage device 220, or other memory in the controller 200. Alternatively, the processor 110 and component sub-processors may operate by executing instructions stored on a memory (not shown) in the SoC 100. The processor 110 or its component sub-processors may be configured to perform actions/steps by executing instructions stored on one or more memories or (if the processors include programmable circuitry such as field programmable gate assembly or application specific integrated circuit) the processor 110 may be configured to perform actions/steps by executing the programmed functions of the processor.

The memory device 210 of the controller 200 may temporarily store and maintain the data of the control device 10. For example, the memory device 210 may be a volatile memory device. For example, the memory device 210 may include a DRAM, an SRAM or the like. A program of the controller 200 may be used by being loaded on the memory device 210. Further, when the control device 10 is in the sleep mode, a power supply of the memory device 210 may be maintained. In this case, the data for the processor cluster 110 may be stored in the memory device 210, and the data may not be deleted as the power supply is maintained. Afterwards, the control device 10 may perform recovery by using the data stored in the memory device 210.

The storage device 220 may store the data of the control device 10. In this case, the storage device 220 may include a non-volatile memory device such as a NAND flash and a NOR flash. The data stored in the storage device 220 may be loaded on the memory device 210. Also, when the control device 10 is booted, the data stored in the storage device 220 may be loaded.

The power manager 230 may manage power for components of the control device 10. For example, the power manager 230 may control power-on and power-off of power for the system on chip 100 and may control the power-on and power-off of power for the controller 200. The power manager 230 may operate in accordance with a preset option. For example, the power manager 230 may include a sleep mode, a normal mode, an idle discontinuous reception (DRX) mode, etc., but the embodiments of the present disclosure are not limited thereto.

The driving device controller 240 may control the driving device 300. The read-only memory 250 may store data required for booting the control device 10. The read-only memory 250 may be a non-volatile memory, and the data stored therein may be pre-programmed. The GPU 260 may perform graphic processing for the data. The GPU 260 may process image data to be displayed on a display device of the driving device 300. The interface 270 may transmit and receive data between the controller 200 and the system on chip 100 and may transmit and receive data between the controller 200 and the driving device 300.

Although the system on chip 100 and the controller 200 in control device 10 are shown as being separated from each other in FIG. 2, the embodiments of the present disclosure are not limited thereto. For example, all or some of the controller 200 may be included in the system on chip 100, and the system on chip 100 may be included in the controller 200. In the present disclosure, the description will be based on that the system on chip 100 and the controller 200 are mounted on one main board.

Figure 3:
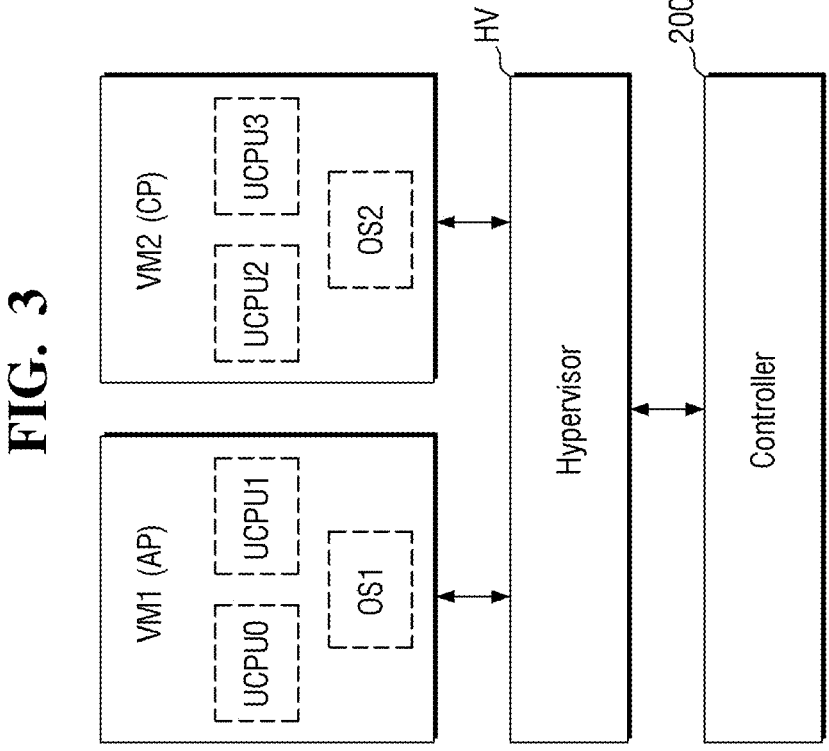
FIG. 3 is a diagram illustrating a virtual machine according to some example embodiments.
Figure 4:
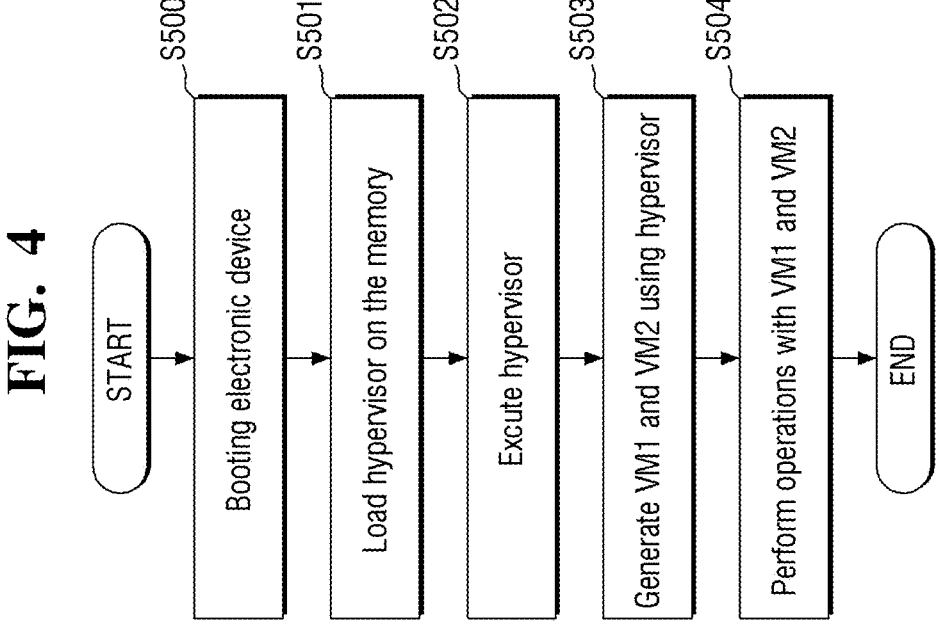
FIG. 4 is a flow chart illustrating a method of generating a virtual machine according to some example embodiments.

FIG. 3 is a diagram illustrating a virtual machine according to some example embodiments. FIG. 4 is a flow chart illustrating a method of generating a virtual machine according to some example embodiments.

Referring to FIGS. 2 to 4, the electronic device 1 may be booted (S500). The power manager 230 of the control device 10 included in the electronic device 1 may manage power transferred to the components of the control device 10. When the electronic device 1 is booted, the control device 10 may be powered on.

The control device 10 may load a hypervisor HV on the memory device 210 (S501). For example, when the power manager 230 of the control device 10 releases reset of the first sub-processor cluster 112, a boot loader operating as the first sub-processor cluster 112 may load the hypervisor HV on the memory device 210. The control device 10 may load the hypervisor HV on the memory device 210 in response to the booting operation of the electronic device 1. In this case, the hypervisor HV may correspond to software stored in the storage device 220. The memory device 210 may temporarily store the hypervisor HV. That is, as shown in FIG. 3, the hypervisor HV may be generated and loaded by the controller 200 of the control device 10. In this case, the hypervisor HV may correspond to a virtual machine generator.

The control device 10 may execute the hypervisor HV (S502). The processor cluster 110 of the control device 10 may execute the hypervisor HV loaded from the memory device 210. In this case, data may be transmitted and received between the system on chip 100 and the controller 200.

The controller 200 of the control device 10 may generate a first virtual machine VM1 and a second virtual machine VM2 by using the hypervisor HV (S503). The processor cluster 110 may execute a first virtual machine VM1 and a second virtual machine VM2, which are different from each other, by using the hypervisor HV. For example, the first sub-processor cluster 112 may execute the first virtual machine VM1, and the second sub-processor cluster 114 may execute the second virtual machine VM2.

Referring to FIG. 3, the first virtual machine VM1 may operate as the application processor and may be executed by the (0)th CPU UCPU0 and the first CPU UCPU1. The first virtual machine VM1 may also be executed using a first operating system OS1. The second virtual machine VM2 may operate as a communication processor and may be executed by the second CPU UCPU2 and the third CPU UCPU3. The second virtual machine VM2 may be executed using a second operating system OS2. That is, the first virtual machine VM1 and the second virtual machine VM2 may be assigned with different resources of the components of the controller 200 and the system on chip 100 and may operate using the resources.

The processor cluster 110 may perform operations using the first virtual machine VM1 and the second virtual machine VM2 (S504). That is, the first sub-processor cluster 112 and the second sub-processor cluster 114 may independently perform different operations using different virtual machines. The first sub-processor cluster 112 may perform a computation operation by using the first virtual machine VM1, and the second sub-processor cluster 114 may perform a computation operation related to communication by using the second virtual machine VM2. As described above, the electronic device 1 may be booted to generate the first virtual machine VM1 and the second virtual machine VM2, and the operation of the control device 10 may be performed using the virtual machines.

The first virtual machine VM1 may correspond to a host domain, and the second virtual machine VM2 may correspond to a guest domain. However, in the case of an idle DRX mode after a sleep mode, which will be described later, the second virtual machine VM2 may correspond to the host domain.

Figure 5:
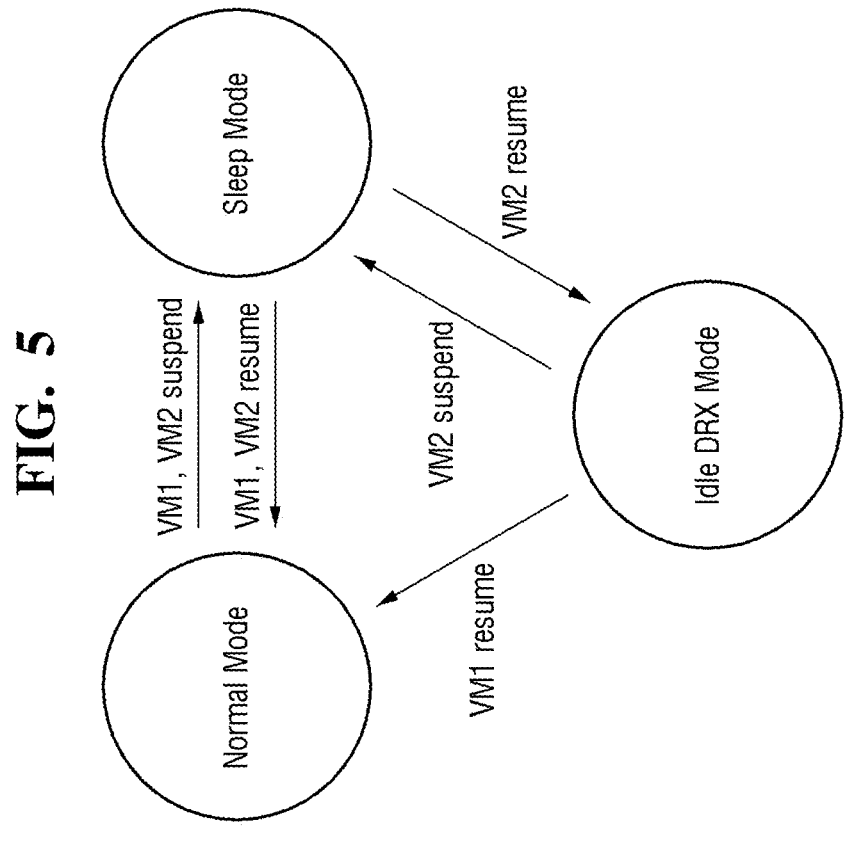
FIG. 5 is a diagram illustrating a mode of a control device according to some example embodiments.

FIG. 5 is a diagram illustrating a mode of a control device according to some example embodiments.

Referring to FIG. 5, the control device 10 may operate in three modes. For example, the control device 10 may operate in a normal mode, a sleep mode and an idle DRX mode. In this case, the name of each mode is merely an example, and the embodiments of the present disclosure are not limited thereto.

The normal mode of the control device 10 may correspond to the case that the components of the control device 10 are powered on and perform all operations. For example, the first sub-processor cluster 112 and the second sub-processor cluster 114 of the control device 10 in the normal mode may be powered on and may perform their respective operations. At this time, since all the components of the control device 10 are powered on, relatively high amounts of power may be consumed.

The sleep mode of the control device 10 may correspond to the case that the components of the control device 10 are powered off and do not perform any operation. For example, the first sub-processor cluster 112 and the second sub-processor cluster 114 of the control device 10 in the sleep mode may be powered off. In this case, information on the first virtual machine VM1 of the first sub-processor cluster 112 and information on the second virtual machine VM2 of the second sub-processor cluster 114 may be stored in the memory device 210. That is, suspend to RAM (S2R) may be performed. The memory device 210 in the sleep mode may maintain the power-on. That is, even in the case of the sleep mode, the memory device 210 may be powered on to store the information on the first virtual machine VM1 and the second virtual machine VM2. In addition, the operation of the control device 10 in the sleep mode may be performed using the minimum power by the alive module 120. That is, since most of the components of the control device 10 are powered off in the sleep mode, relatively low amounts of power may be consumed.

The idle DRX mode of the control device 10 may correspond to the case that only some components of the control device 10 are powered on and the other components of the control device 10 are powered off. For example, in the idle DRX mode, the first sub-processor cluster 112 may be powered off and the second sub-processor cluster 114 may be powered on. In this case, the second sub-processor cluster 114 and the communication CPU LPCU may perform communication with the external device, but the first sub-processor cluster 112 may not perform a computation operation. As only some components of the control device 10 operate, the control device 10 in the idle DRX mode may consume less power than in the normal mode.

The control device 10 may operate by selecting one of the normal mode, the sleep mode and the idle DRX mode. That is, the control device 10 may operate by switching the mode. For example, when the normal mode is switched to the sleep mode, a suspend operation for the first virtual machine VM1 and the second virtual machine VM2 may be performed by the hypervisor HV. That is, the information on the first virtual machine VM1 and the second virtual machine VM2 may be transferred to and stored in the memory device 210 of the controller 200, and the processor cluster 110 may be powered off. When the sleep mode is switched to the normal mode, a resume operation for the first virtual machine VM1 and the second virtual machine VM2 may be performed by the hypervisor HV. That is, the information on the first virtual machine VM1 and the second virtual machine VM2, which is stored in the memory device 210, may be transferred to the processor cluster 110. The processor cluster 110 may execute and operate the first virtual machine VM1 and the second virtual machine VM2 based on the received information.

When the sleep mode is switched to the idle DRX mode, the resume operation for the second virtual machine VM2 may be performed by the hypervisor HV. That is, the information on the second virtual machine VM2, which is stored in the memory device 210, may be transferred to the processor cluster 110. The processor cluster 110 may execute and operate the second virtual machine VM2 based on the received information on the second virtual machine VM2. Although the description is based on that only the second virtual machine VM2 is resumed in the idle DRX mode, the embodiments of the present disclosure are not limited thereto. For example, only the first virtual machine VM1 may be resumed in the idle DRX mode.

When the idle DRX mode is switched to the sleep mode, the suspend operation for the second virtual machine VM2 may be performed by the hypervisor HV. That is, the information on the second virtual machine VM2 may be transferred to and stored in the memory device 210. After the suspend operation for the second virtual machine VM2 is performed, the components of the control device 10 may be powered off.

When the idle DRX mode is switched to the normal mode, the resume operation for the first virtual machine VM1 may be performed by the hypervisor HV. The information on the first virtual machine VM1, which is stored in the memory device 210, may be transferred to the processor cluster 110. In this case, all of the (0)th to third CPUs UCPU0 to UCPU3 may perform operations, and all of the components of the control device 10 may be powered on.

Hereinafter, switching of the control device 10 from the normal mode to the sleep mode will be described with reference to FIGS. 6 to 8.

Figure 6:
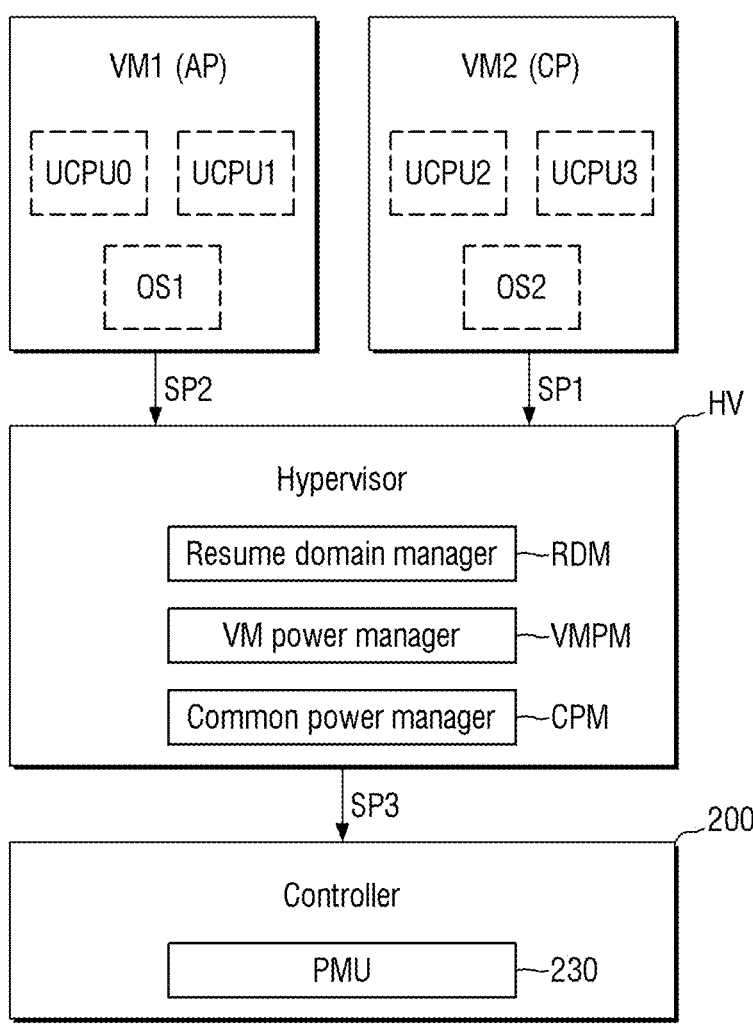
FIG. 6 is a diagram illustrating a suspend operation of a control device according to some example embodiments.

FIG. 6 is a diagram illustrating a suspend operation of a control device according to some example embodiments. FIG. 7 is a flow chart illustrating a suspend operation of a control device according to some example embodiments. FIG. 8 is a diagram illustrating a control device in a sleep mode.

Referring to FIG. 6, the hypervisor HV may include a resume domain manager RDM, a virtual machine power manager VMPM, and a common power manager CPM. The corresponding components of the hypervisor HV are examples, and the embodiments of the present disclosure are not limited thereto.

Figure 7:
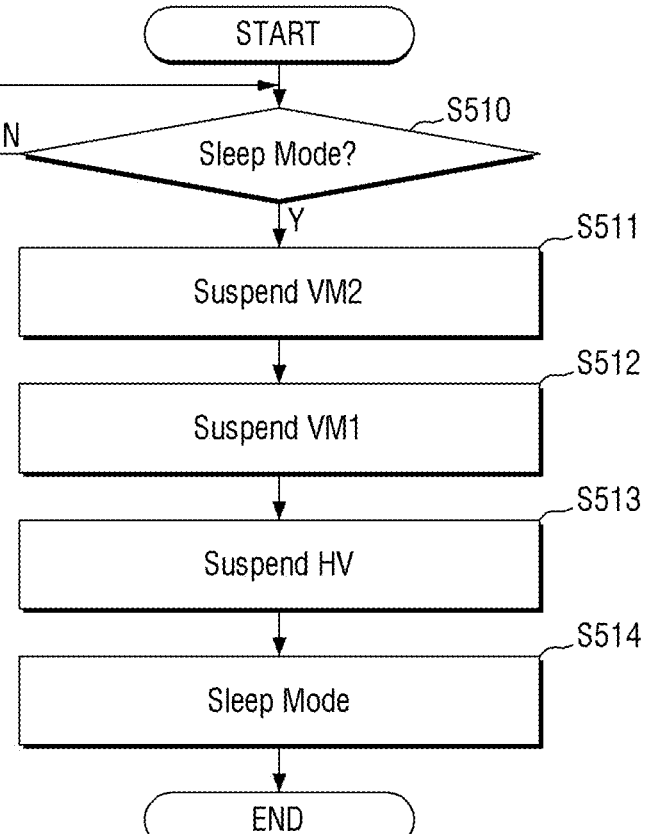
FIG. 7 is a flow chart illustrating a suspend operation of a control device according to some example embodiments.
Figure 8:
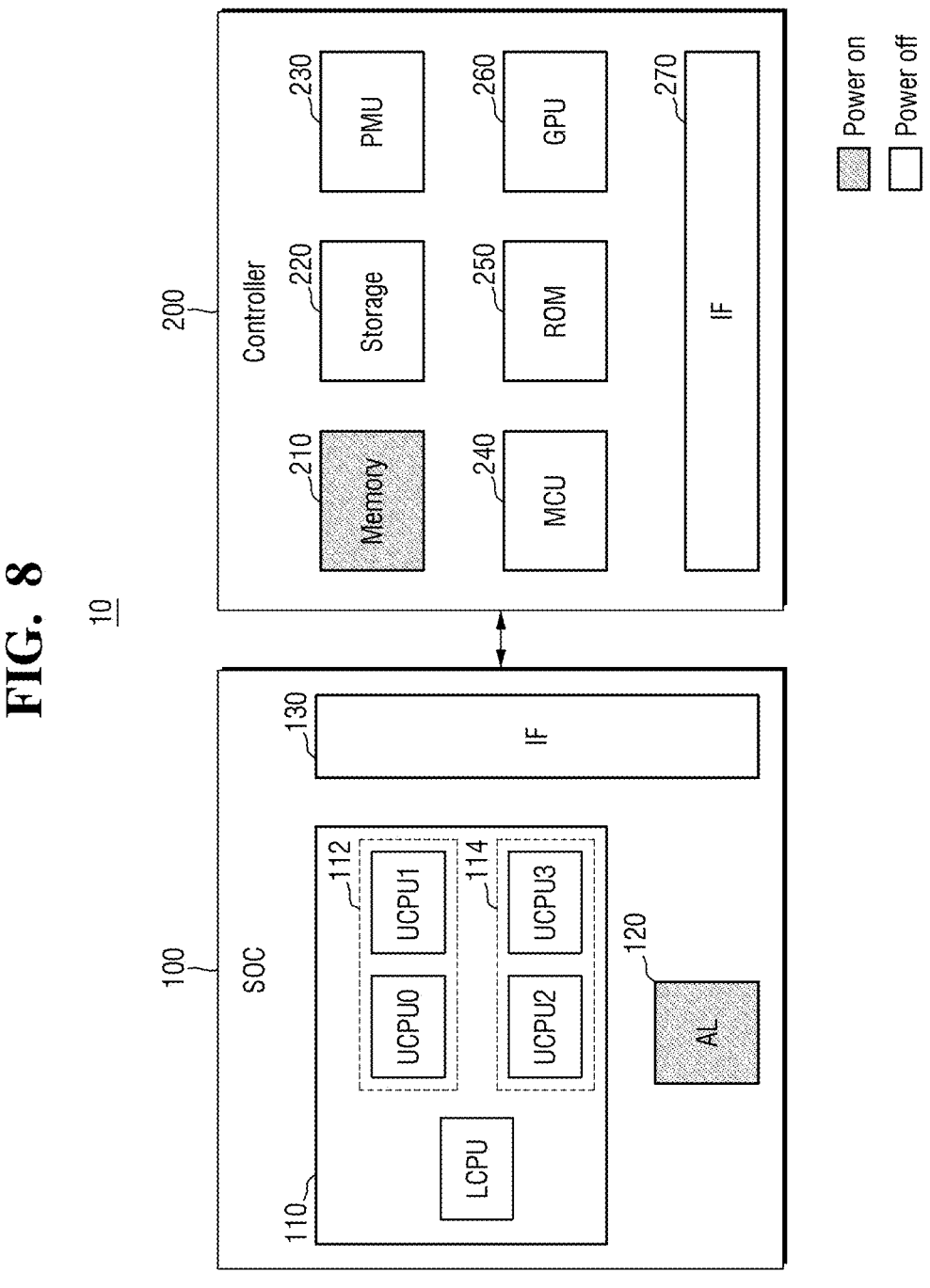
FIG. 8 is a diagram illustrating a control device in a sleep mode.

Referring to FIGS. 6 to 8, the control device 10 may determine whether to enter the sleep mode (S510). That is, the control device 10 may determine whether to enter the sleep mode from the normal mode. When the control device 10 does not enter the sleep mode (S510—N), the control device 10 may again operate in the normal mode.

When the control device 10 enters the sleep mode (S510—Y), the hypervisor HV of the control device 10 may perform a suspend operation for the second virtual machine VM2 (S511). So, the second sub-processor cluster 114 that executes the second virtual machine VM2 may perform a first suspend operation SP1 which stops an operation on the second sub-processor cluster 114. Information on the second virtual machine VM2 may be stored in the memory device 210 of the controller 200. After the first suspend operation SP1 is performed, the second sub-processor cluster 114 may be powered off. That is, the second virtual machine VM2 executed by the second sub-processor cluster 114 may be deleted.

After the first suspend operation SP1 is completed, the hypervisor HV of the control device 10 may perform a suspend operation for the first virtual machine VM1 (S512). So, the first sub-processor cluster 112 that executes the first virtual machine VM1 may perform a second suspend operation SP2 which stops an operation on the first sub-processor cluster 112. Information on the first virtual machine VM1 may be stored in the memory device 210. After the second suspend operation SP2 is performed, the first sub-processor cluster 112 may be powered off. That is, the first virtual machine VM1 executed by the first sub-processor cluster 112 may be deleted.

At this time, deleting the first virtual machine VM1 and the second virtual machine VM2 may be performed by the virtual machine power manager VMPM of the hypervisor HV. That is, the virtual machine power manager VMPM may power off the first sub-processor cluster 112 and the second sub-processor cluster 114.

Subsequently, the control device 10 may perform a suspend operation for the hypervisor HV (S513). That is, the control device 10 may delete the hypervisor HV from the memory device 210. The hypervisor HV may control the power manager 230 of the controller 200 by using the common power manager CPM through a third suspend operation SP3. As a result, the control device 10 may be powered off, and may enter the sleep mode (S514).

Referring to FIG. 8, the control device 10 may include an alive module 120 and a memory device 210, which are powered on in the case of the sleep mode. The components excluding the alive module 120 and the memory device 210 may be powered off. The memory device 210 may continuously store the information on the first virtual machine VM1 and the second virtual machine VM2, which is stored therein, through the suspend operation. Also, the alive module 120 may control the operation of the system on chip 100 in a sleep state. That is, the CPU of the alive module 120 may control the control device 10 on behalf of the processor cluster 110. Therefore, the control device 10 in the sleep mode may reduce power consumption.

Hereinafter, switching of the control device 10 from the sleep mode to the idle DRX mode will be described with reference to FIGS. 9 to 12.

Figure 9:
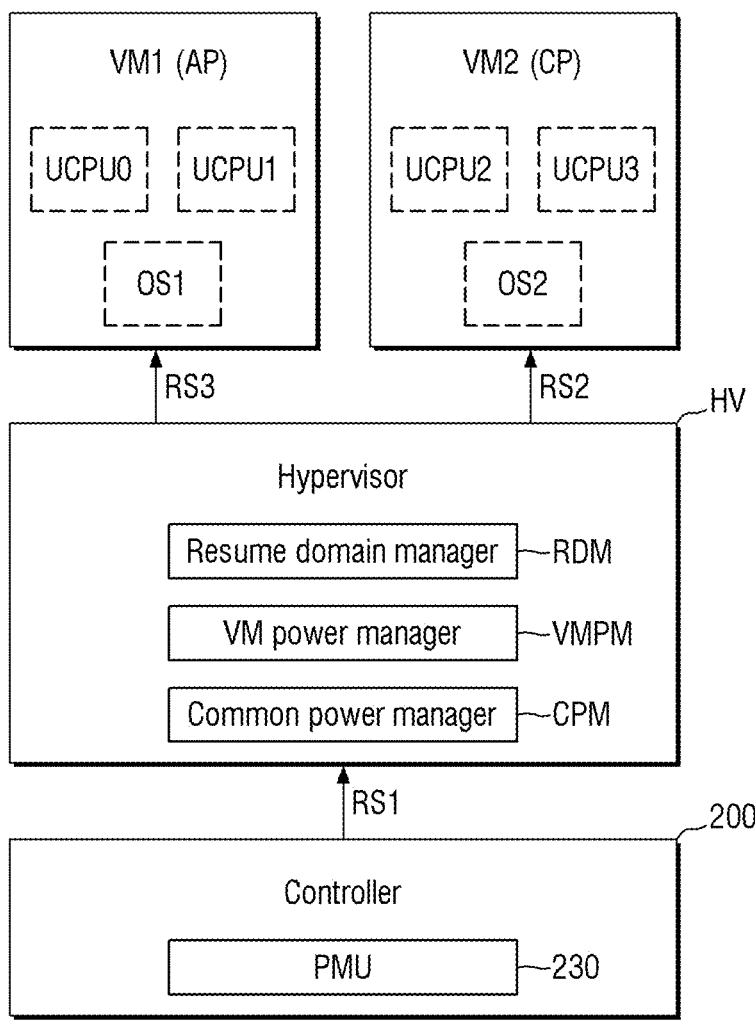
FIG. 9 is a diagram illustrating a resume operation of a control device according to some example embodiments.
Figure 10:
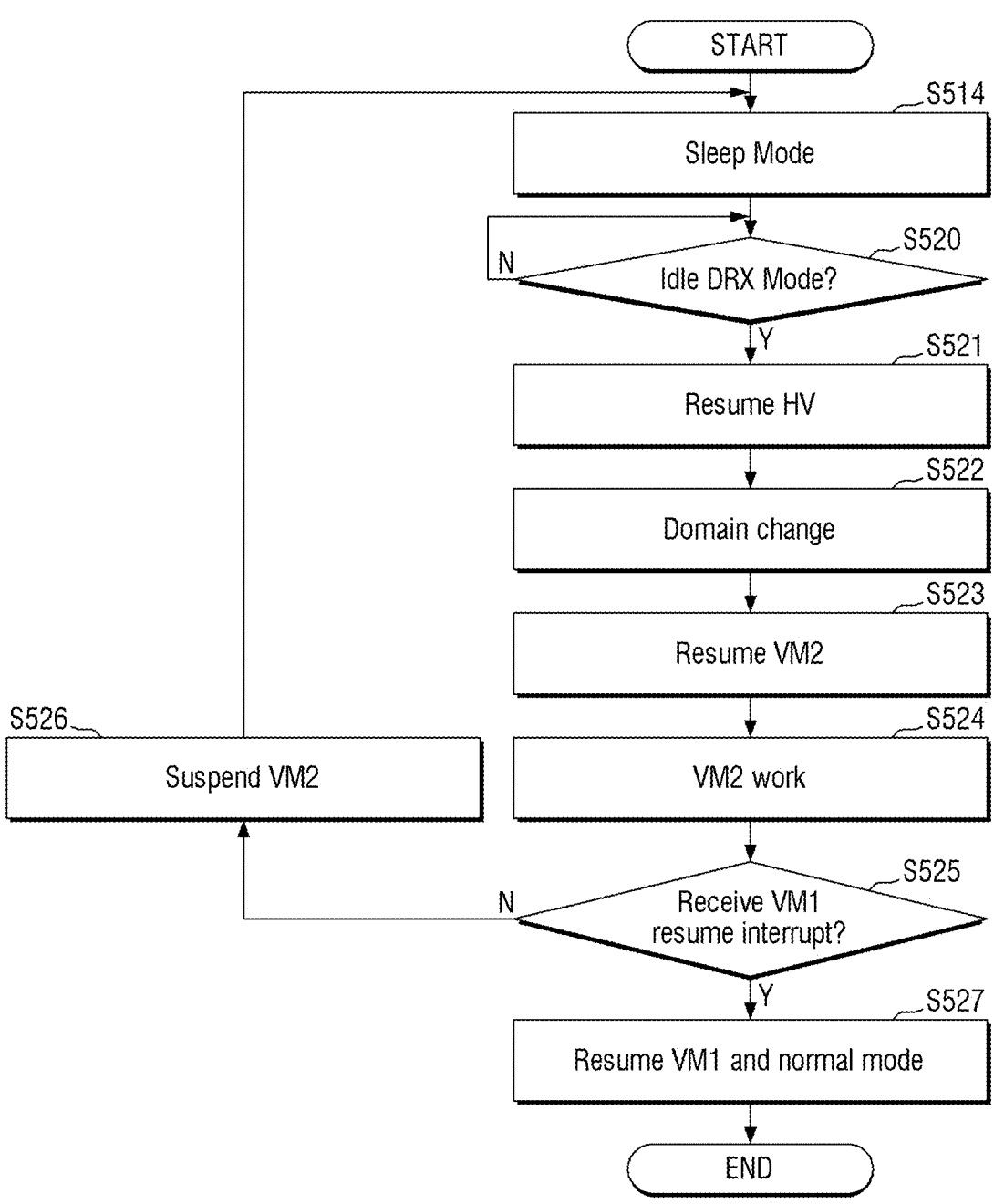
FIG. 10 is a flow chart illustrating a resume operation of a control device according to some example embodiments.
Figure 11:
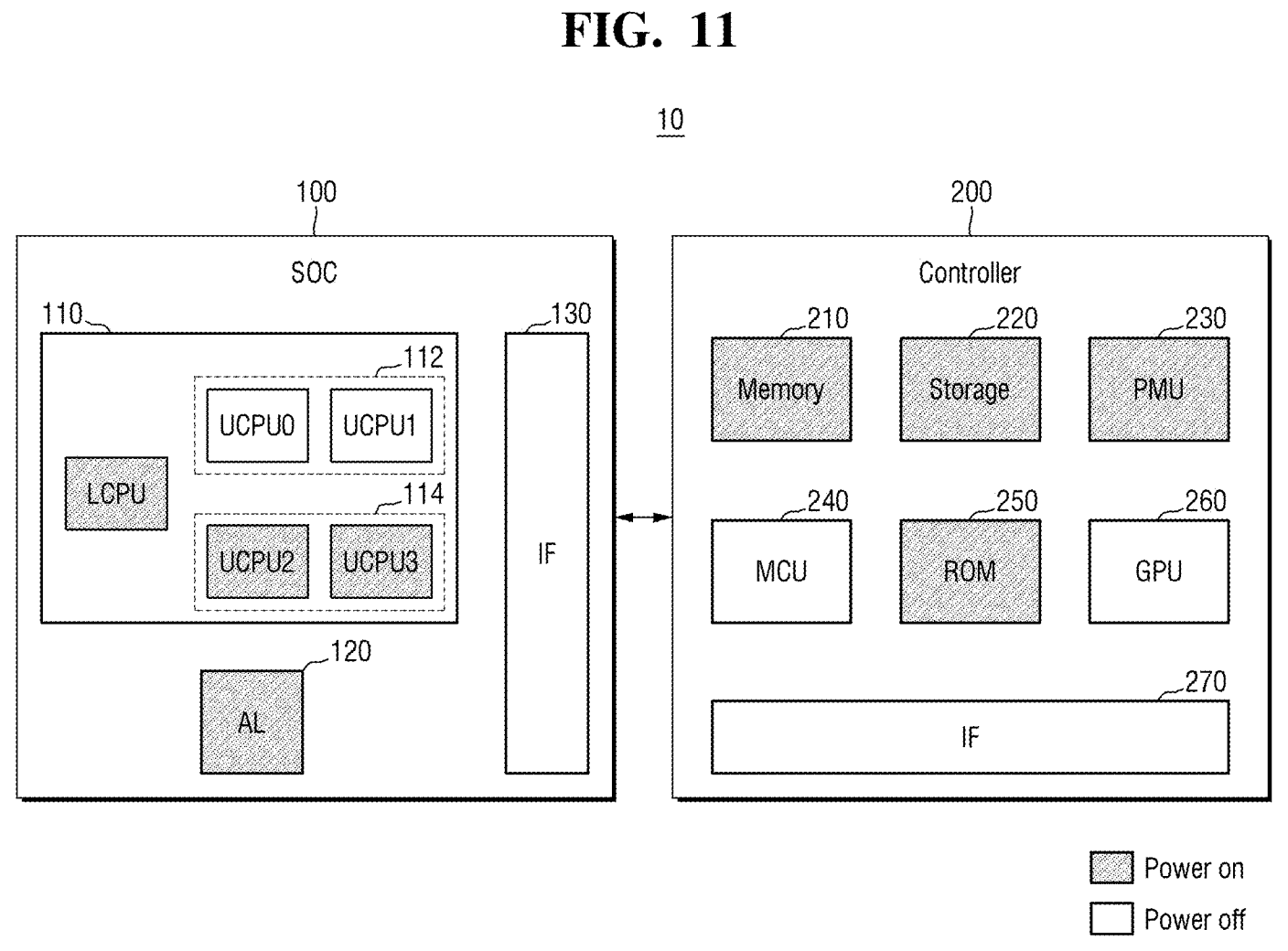

FIG. 9 is a diagram illustrating a resume operation of a control device according to some example embodiments. FIG. 10 is a flow chart illustrating a resume operation of a control device according to some example embodiments. FIG. 11 is a diagram illustrating a control device in an idle DRX mode. FIG. 12 is a diagram illustrating operations of CPUs according to some example embodiments.

Referring to FIGS. 9 and 10, the control device 10 may be in the sleep mode (S514). Afterwards, the control device 10 may determine whether to enter the idle DRX mode (S520). That is, the control device 10 may determine whether to enter the idle DRX mode from the sleep mode. When the control device 10 does not enter the idle DRX mode (S520—N), the control device 10 may again operate in the sleep mode.

When the control device 10 enters the idle DRX mode (S520—Y), the control device 10 may perform a resume operation for the hypervisor HV (S521). That is, the control device 10 may perform a first resume operation RS1 for generating the hypervisor HV. For example, some components of the controller 200 of the control device 10 may be powered on. Referring to FIG. 11, the memory device 210 is maintained at a power-on state, and the storage device 220, the power manager 230 and the read-only memory 250 may be powered on. The control device 10 may load the hypervisor HV, which is stored in the storage device 220, on the memory device 210, and the processor cluster 110 may execute the hypervisor HV from the memory device 210.

Subsequently, the control device 10 may perform a domain change (S522). For example, the resume domain manager RDM of the hypervisor HV may perform a domain change for the resume. In the sleep mode or the normal mode, the domain for the resume of the hypervisor HV may correspond to a host domain, i.e., the first sub-processor cluster 112. The control device 10 may change the domain for the resume of the hypervisor HV to a guest domain, that is, a domain corresponding to the second sub-processor cluster 114, through the domain change. As a result, the second sub-processor cluster 114 may have authority to perform a resume operation.

Subsequently, the control device 10 may perform a resume operation for the second virtual machine VM2 (S523). That is, the control device 10 may perform a second resume operation RS2. The control device 10 may generate the second virtual machine VM2 by using the hypervisor HV. In this case, the hypervisor HV may generate the second virtual machine VM2 based on the information on the second virtual machine VM2, which is stored in the memory device 210. At this time, the second sub-processor cluster 114 may be powered on, and the first sub-processor cluster 112 may be powered off. That is, the (0)th CPU UCPU0 and the first CPU UCPU1 may be powered off, and the second CPU UCPU2 and the third CPU UCPU3 may be powered on. As a result, the second virtual machine VM2 may be operated and executed on the second sub-processor cluster 114 (S524). For example, the second sub-processor cluster 114 may perform communication with an external device by using the second virtual machine VM2. That is, the second sub-processor cluster 114 may process data from the external device by using the second virtual machine VM2.

Referring to FIG. 11, the first sub-processor cluster 112, the driving device controller 240 and the GPU 260 may be powered off, and the other components of the control device 10 may be powered on. That is, in the idle DRX mode, the control device 10 may operate only some components of which operations are essentially required, thereby reducing power consumption. In addition, both the application processor and the communication processor may be implemented by the processor cluster 110, whereby less power may be consumed than the case that the two processors are used.

Referring to FIG. 12, during a time period of a first time t1 to a second time t2, the resume operation S521 and the resume domain change operation S522 for the hypervisor HV may be performed by the (0)th CPU UCPU0 of the first sub-processor cluster 112. That is, in the sleep mode, the first sub-processor cluster 112 has authority to resume.

During a time period of the second time t2 to a third time t3, the processor cluster 110 may change the domain from the (0)th CPU UCPU0 to the second CPU UCPU2. At this time, the (0)th CPU UCPU0 may provide a first SOFT IRQ (soft interrupt request) interrupt SOFT IRQ INT1 to the second CPU UCPU2. In this case, the first SOFT IRQ interrupt SOFT IRQ INT1 may correspond to a signal transferred through a kernel. Therefore, the second CPU UCPU2 may have authority for the resume operation. In addition, the (0)th CPU UCPU0 may not perform the operation, and the first virtual machine VM1 may not be generated even after the third time t3.

During a time period of the third time t3 to a fourth time t4, the second CPU UCPU2 may perform a resume operation (S523) for the second virtual machine VM2 and perform the operation (S524) of the second virtual machine VM2. Therefore, the second virtual machine VM2 may be generated, and the processor cluster 110 may perform a communication operation by using the second virtual machine VM2. That is, the control device 10 may operate in the idle DRX mode.

During a time period of the fourth time t4 to a fifth time t5, the processor cluster 110 may change the domain from the second CPU UCPU2 to the (0)th CPU UCPU0. At this time, the second CPU UCPU2 may provide a second SOFT IRQ interrupt SOFT IRQ INT2 to the (0)th CPU UCPU0. In this case, the second SOFT IRQ interrupt SOFT IRQ INT2 may correspond to a signal transferred through a kernel. Therefore, the (0)th CPU UCPU0 may have authority for the resume operation. In this case, the (0)th CPU UCPU0 may power off the power supply of the components of the control device 10. Therefore, the control device 10 may enter the sleep mode.

Referring back to FIG. 10, the system on chip 100 may determine whether a first virtual machine resume interrupt is received (S525). For example, the second sub-processor cluster 114 may receive a signal from a user equipment UE that is the external device. That is, the second sub-processor cluster 114 may operate in response to the signal from the user equipment UE.

When the first virtual machine resume interrupt is not received (S525—N), the control device 10 may perform a suspend operation for the second virtual machine VM2 (S526). That is, the information on the second virtual machine VM2 may be stored in the memory device 210, and the second virtual machine VM2 may be deleted. In addition, the second sub-processor cluster 114 may be powered off. Therefore, the control device 10 may again be in the sleep mode (S514). That is, when a resume signal for the first virtual machine VM1 is not received from the user equipment UE, the second sub-processor cluster 114 for the second virtual machine VM2 is again powered off, whereby power consumption may be reduced.

When the first virtual machine resume interrupt is received (S525—Y), the hypervisor HV of the control device 10 may perform a resume operation for the first virtual machine VM1 and may be switched to the normal mode (S527). That is, the control device 10 may perform a third resume operation RS3. The control device 10 may generate the first virtual machine VM1 by using the hypervisor HV. In this case, the control device 10 may generate the first virtual machine VM1 based on the information on the first virtual machine VM1, which is stored in the memory device 210. Therefore, both the first sub-processor cluster 112 and the second sub-processor cluster 114 may be powered on. That is, as the first sub-processor cluster 112 operates, if necessary, the control device 10 may return to the normal mode.

Figure 13:
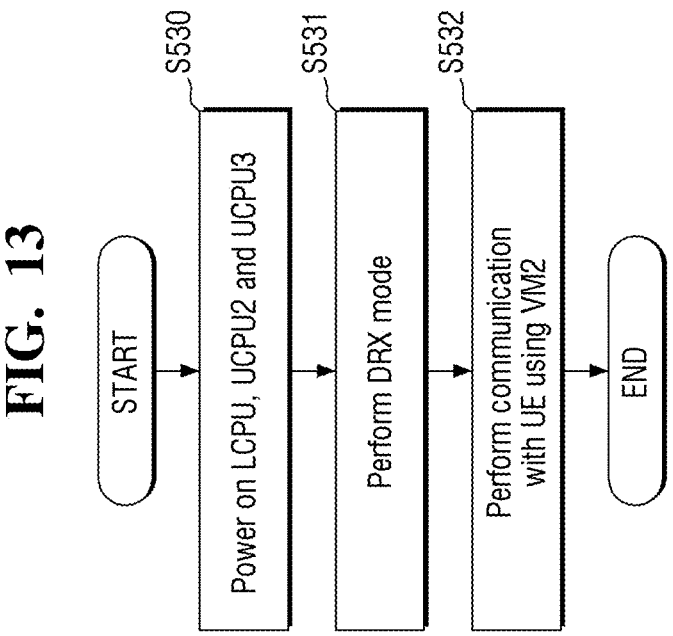
Figure 14:
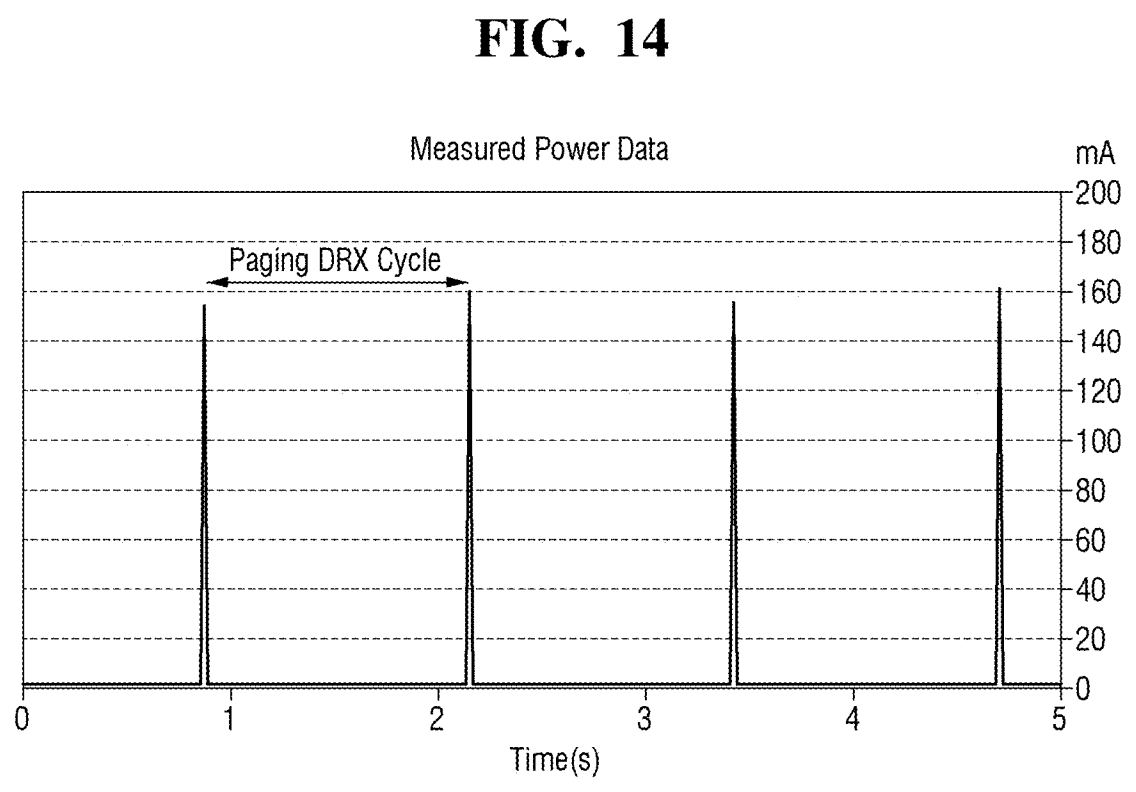

FIGS. 13 and 14 are diagrams illustrating a DRX mode.

Referring to FIGS. 11, 13 and 14, the first sub-processor cluster 112 in the idle DRX mode may be powered off, and the second sub-processor cluster 114 may be powered on. That is, the communication CPU LCPU, the second CPU UCPU2 and the third CPU UCPU3 may be powered on (S530). At this time, the control device 10 may perform the DRX mode (S531). Referring to FIG. 14, the control device 10 may use a current generated at a period of a paging DRX cycle. That is, the control device 10 uses only a discontinuously applied current and does not use a continuously applied current, whereby power consumption may be reduced. The control device 10 may perform the DRX mode in the idle DRX mode. That is, the control device 10 may perform communication with the user equipment UE by using the second virtual machine VM2 (S532). In this case, only the second sub-processor cluster 114 may operate.

FIG. 15 is a diagram illustrating a control device in a normal mode. FIG. 16 is a diagram illustrating operations of CPUs according to some example embodiments.

Referring to FIG. 15, in the normal mode, the first sub-processor cluster 112 and the second sub-processor cluster 114 may all be powered on. In this case, the control device 10 may correspond to a state after the operation S527 of FIG. 10 has been performed. That is, in response to the first virtual machine resume interrupt, the control device 10 may resume the first virtual machine VM1 and be in a normal mode state.

Referring to FIG. 16, during the time period of the fourth time t4 to the fifth time t5, the processor cluster 110 may change the domain from the second CPU UCPU2 to the (0)th CPU UCPU0. At this time, the second CPU UCPU2 may provide a third SOFT IRQ interrupt SOFT IRQ INT3 to the (0)th CPU UCPU0. In this case, the third SOFT IRQ interrupt SOFT IRQ INT3 may correspond to a resume signal transferred through a kernel. As a result, the (0)th CPU UCPU0 may have authority for the resume operation. In this case, the (0)th CPU UCPU0 may perform a resume operation for the first virtual machine VM1. That is, as both the first sub-processor cluster 112 and the second sub-processor cluster 114 operate, the control device 10 may be switched to the normal mode.

As described above, only a portion of the processor cluster 110 operates in the idle DRX mode and the other portion thereof does not operate, whereby power consumption of the control device 10 may be reduced. At the same time, the control device 10 may perform an efficient operation by receiving an interrupt from the user equipment UE and switching the idle DRX mode to the normal mode in response to the interrupt.

Hereinafter, the operation of the control device 10 according to some example embodiments will be described with reference to FIGS. 17 and 18.

FIG. 17 is a diagram illustrating a control device according to some example embodiments. FIG. 18 is a flow chart illustrating a resume operation of a control device according to some example embodiments. For convenience of description, portions duplicated with those described with reference to FIGS. 1 to 16 will be described briefly or omitted.

Referring to FIG. 17, the first sub-processor cluster 112 may be powered on, and the second sub-processor cluster 114 may be powered off. That is, unlike the case that the first sub-processor cluster 112 of the control device 10 is powered off and the second sub-processor cluster 114 thereof is powered on in the idle DRX mode, which is described with reference to FIGS. 1 to 16, only the first sub-processor cluster 112 may be powered on.

In other words, only the first sub-processor cluster 112 may be powered on to perform the operation. As a result, the power consumed by the control device 10 may be more reduced.

Referring to FIGS. 17 and 18, the control device 10 may operate differently from the operation of the control device 10 described with reference to FIGS. 1 to 16. In the present embodiment, the operations of S514, S521, S523 and S527 may be the same as those described with reference to FIGS. 1 to 16.

After performing the resume operation for the hypervisor HV (S521), the control device 10 may determine whether to switch the domain (S540). In the sleep mode, the domain for the operation of the control device 10 is assigned by the (0)th CPU UCPU0. When the control device 10 switches the domain (S540—Y), the control device 10 may provide the authority for the resume operation to the second CPU UCPU2.

When the control device 10 does not switch the domain (S540—N), the control device 10 may determine whether it corresponds to the normal mode (S541). When the control device 10 does not correspond to the normal mode (S541—N), the control device 10 may perform the resume operation for the first virtual machine VM1 (S542). That is, the first sub-processor cluster 112 may be powered on, and the second sub-processor cluster 114 may be powered off. That is, the control device 10 may be in the state shown in FIG. 17. In addition, the first virtual machine VM1 may operate (S543). For example, the first sub-processor cluster 112 may perform computation with the controller 200 by using the first virtual machine VM1. As the second sub-processor cluster 114 does not operate, power consumption may be reduced.

When the control device 10 corresponds to the normal mode (S541—Y), the control device 10 may perform the resume operation for the first virtual machine VM1 and the second virtual machine VM2 (S544). That is, both the first sub-processor cluster 112 and the second sub-processor cluster 114 may be powered on. Therefore, the first virtual machine VM1 and the second virtual machine VM2 may operate (S545).

That is, the first virtual machine VM1 performed by the first sub-processor cluster 112 and the second virtual machine VM2 performed by the second sub-processor cluster 114 may operate independently. That is, when the first virtual machine VM1 operates, the second virtual machine VM2 may not operate. When the first virtual machine VM1 does not operate, the second virtual machine VM2 may operate. Therefore, the control device 10 with more improved performance may be provided.

Hereinafter, a control device 10' according to some other embodiments will be described with reference to FIGS. 19 and 20.

FIG. 19 is a diagram illustrating a control device according to some example embodiments. FIG. 20 is a diagram illustrating an operation of a control device according to some example embodiments. For convenience of description, portion duplicated with those described with reference to FIGS. 1 to 16 will be described briefly or omitted.

Referring to FIG. 19, a system on chip 100' of the control device 10' may include a processor cluster 110 that includes a first sub-processor cluster 112, a second sub-processor cluster 114, and a third sub-processor cluster 116. That is, the processor cluster 110 may include three different sub-processor clusters. In this case, the third sub-processor cluster 116 may include a fourth CPU UCPU4 and a fifth CPU UCPU5. In the normal mode, the first sub-processor cluster 112, the second sub-processor cluster 114 and the third sub-processor cluster 116 may all be powered on.

Referring to FIG. 20, the first sub-processor cluster 112 may perform an operation as an application processor by using the first virtual machine VM1, and the second sub-processor cluster 114 may operate as a communication processor by using the second virtual machine VM2. The third sub-processor cluster 116 may perform an operation different from those of the first virtual machine VM1 and the second virtual machine VM2 by using a third operating system OS3 and a third virtual machine VM3.

In addition, the first to third sub-processor clusters 112, 114 and 116 may operate independently. That is, any one of the first to third sub-processor clusters 112, 114 and 116 is not dependent on the other one, but the embodiments of the present disclosure are not limited thereto. For example, the system on chip 100' may include a larger number of sub-processor clusters. The sub-processor clusters different from the first to third sub-processor clusters 112, 114 and 116 may execute virtual machines different from the first to third virtual machines VM1 to VM3. That is, the system on chip 100' may execute four or more virtual machines.

Hereinafter, the electronic device 1 according to some example embodiments will be described with reference to FIG. 21.

FIG. 21 is a diagram illustrating an electronic device according to some example embodiments. For convenience of description, portions duplicated with those described with reference to FIGS. 1 to 16 will be described briefly or omitted.

Referring to FIG. 21, a driving device 300 may include a first display DSP1 and a second display DSP2. In this case, the driving device 300 may be connected with the control device 10, and thus the first display DSP1 and the second display DSP2 may also be connected to the control device 10. The first display DSP1 and the second display DSP2 may correspond to a display device that outputs different image signals output from the control device 10.

The first display DSP1 may receive an image signal processed by the first sub-processor cluster 112, and the second display DSP2 may receive an image signal processed by the second sub-processor cluster 114. In the case that the control device 10 is in the normal mode, both the first display DSP1 and the second display DSP2 may be powered on and may output the image signals. In the case that the control device 10 is in the idle DRX mode, the first display DSP1 may not receive the image signal from the first sub-processor cluster 112, but the second display DSP2 may receive the image signal from the second sub-processor cluster 114. That is, the first display DSP1 cannot output the image signal, but the second display DSP2 may output the image signal. That is, as the first virtual machine VM1 of the first sub-processor cluster 112 and the second virtual machine VM2 of the second sub-processor cluster 114 operate independently, the first and second displays DSP1 and DSP2 may also operate independently, but the example embodiments of the present disclosure are not limited thereto.

Hereinafter, a vehicle 700, which includes an electronic control device 710, according to some other embodiments will be described with reference to FIG. 22.

FIG. 22 is a diagram illustrating a vehicle, which includes an electronic control device, according to some example embodiments. For convenience of description, portions duplicated with those described with reference to FIGS. 1 to 21 will be described briefly or omitted.

Referring to FIG. 22, the vehicle 700 may include a plurality of electronic control units (ECU) 710 and a memory storage device 720. At this time, the electronic control device 710 may correspond to the control device 10 described as above. That is, the electronic control device 710 may operate in one of a normal mode, a sleep mode and an idle DRX mode. In addition, the other components of the vehicle 700 may correspond to the driving device 300 described as above.

Each of the plurality of electronic control devices 710 is electrically, mechanically, and communicatively connected to at least one of a plurality of devices provided in the vehicle 700 and may control an operation of at least one device based on any one function execution command.

In this case, the plurality of devices may include an acquisition device 730 for acquiring information required for performing at least one function, and a driving unit 740 for performing at least one function.

For example, the acquisition device 730 may include various detection units and image acquisition units, and the driving unit 740 may include a fan and a compressor of an air conditioning device, a fan of a ventilation device, an engine and a motor of a power device, a motor of a steering device, a motor and a valve of a braking device, and a switching device of a door or tail gate.

The plurality of electronic control devices 710 may perform communication with the acquisition device 730 and the driving unit 740 by using at least one of Ethernet, low voltage differential signal (LVDS) communication or Local Interconnect Network (LIN) communication. That is, the above-described system on chip 100 may process data of the acquisition device 730 and the driving unit 740 by using the first virtual machine VM1 and the second virtual machine VM2.

The plurality of electronic control devices 710 may control the operation of the driving unit 740 for performing a corresponding function when it is determined that the corresponding function needs to be performed after determining whether the corresponding function needs to be performed, based on the information acquired through the acquisition device 730, and may control the operation amount based on the acquired information. At this time, the plurality of electronic control devices 710 may store the acquired information in the memory storage device 720 or read and use the information stored in the memory storage device 720.

The plurality of electronic control devices 710 may control the operation of the driving unit 740 for performing the corresponding function based on a function execution command input through an input unit 750 and may check the setting amount corresponding to information input through the input unit 750 and control the operation of the driving unit 740 for performing the corresponding function, based on the checked setting amount.

Each electronic control device 710 may independently control any one function or may control any one function in conjunction with another electronic control device.

For example, when a distance between an electronic control device of a collision avoidance system and an obstacle detected through a distance detection unit is within a reference distance, the electronic control device of the collision avoidance system may output a warning sound for collision with the obstacle through a speaker.

An electronic control device of an autonomous driving control device may perform autonomous driving in conjunction with an electronic control device of a vehicle terminal, an electronic control device of an image acquisition portion and the electronic control device of the collision avoidance system by receiving navigation information, road image information and distance information from an obstacle and controlling the power device, the braking device and the steering device by using the received information.

A connection control device (TCU) 760 is electrically, mechanically and communicatively connected with the plurality of electronic control devices 710 and performs communication with each of the plurality of electronic control devices 710.

That is, the connection control device 760 may directly perform communication with the plurality of electronic control devices 710 provided inside the vehicle, perform communication with an external server, and perform communication with an external terminal through an interface.

The connection control device 760 may perform communication with the plurality of electronic control devices 710 and may perform communication with a server 810 by using an antenna (not shown) and RF communication. In this case, the server 810 may correspond to the first base station BS1 or the second base station BS2 of FIG. 1.

Also, the connection control device 760 may perform communication with the server 810 through wireless communication. In this case, the wireless communication between the connection control device 760 and the server 810 is possible through various wireless communication methods such as Wifi, Wireless broadband, global System for Mobile Communication (GSM), Code Division Multiple Access (CDMA), Wideband Code Division Multiple Access (WCDMA), universal mobile telecommunications system (UMTS), Time Division Multiple Access (TDMA), Long Term Evolution (LTE), and New Radio (NR).

FIG. 23 is a block diagram of the electronic device according to some embodiments.

As shown, the electronic system 600 includes an electronic device 601, an external electronic device 602 (e.g., a first external electronic device), an external electronic device 604 (e.g., a second external electronic device), a server 608 and a first network 698 and a second network 699.

An electronic device 601 inside the network environment 600 may communicate with the external electronic device 602 through a first network 698, or may communicate with the external electronic device 604 or the server 608 through a second network 699. The first network 698 may be, for example, a short-range wireless communication network. The second network 699 may be, for example, a long-range wireless communication network.

The electronic device 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module 696 (SIM), an antenna module 697, and the like.

In some embodiments, at least one of the components, such as, for example, the image display device 660 or the camera module 680 may be omitted from the electronic device 601, or one or more other components may be added to the electronic device.

In some embodiments, some of the components may be implemented as a single integrated circuit (IC). For example, the sensor module 676 such as a fingerprint sensor, an iris sensor, and an illuminance sensor may be embedded inside an image display device such as a display.

The processor 620 may execute software (e.g., program 640) that controls other components of at least one instance of the electronic device 601, such as hardware or software components connected to the processor 620, to perform various data processing and computations.

As at least a part of data processes or computations, the processor 620 may load command or data received from other components, such as the sensor module 676 or the communication module 690, into a volatile memory 632, process the command or data loaded in the volatile memory 632, and store the result data in the non-volatile memory 634.

The processor 620 may include, for example, a main processor 621 (such as a central processing unit (CPU) or a smartphone central processor (e.g., an application processor AP)), and an auxiliary processor 623 that operates independently of the main processor 621 or operates in connection with the main processor 621.

Such an auxiliary processor 623 may include, for example, a graphic processing unit (GPU), an image signal processor (ISP), a sensor hub processor, a communication processor (CP) or the like.

In some embodiments, the auxiliary processor 623 may be configured to consume less power than the main processor 621 or to perform a particular function. The auxiliary processor 623 may be separated from the main processor 621 or implemented as a part thereof.

The auxiliary processor 623 may control at least some of the functions or states associated with at least one component among the components of the electronic device 601, on behalf of the main processor 621 while the main processor 621 is inactive, and together with the main processor 621 while the main processor 621 is active. In some embodiments, the auxiliary processor 623 may be implemented as control device 10 of FIG. 2.

The memory 630 may store various data used in at least one component of the electronic device 601. The various data may include, for example, software such as program 640, and input data and output data for commands associated therewith. The memory 630 may include a volatile memory 632 and a non-volatile memory 634.

The program 640 may be stored in the memory 630 as software, and may include, for example, an operating system (OS) 642, a middleware 644 or an application 646.

The input device 650 may receive command or data to be used for other components of the electronic device 601 from outside the electronic device 601. The input device 650 may include, for example, a microphone, a mouse or a keyboard.

The sound output device 655 may output a sound signal to the outside of the electronic device 601. The sound output device 655 may include, for example, a speaker or a receiver. The speaker may be used for general purposes to play or record multimedia, and the receiver may be used to receive incoming calls.

The image display device 660 may visually provide information to the outside of the electronic device 601. The image display device may include, for example, a display, a holographic device, or a projector, and a control circuit that controls the display, the holographic device or the projector.

In some embodiments, the image display device 660 may include a touch circuit configured to detect a touch, or a sensor circuit, such as a pressure sensor, configured to measure the intensity of a force caused by the touch.

The audio module 670 may convert sound into an electrical signal and vice versa. In some embodiments, the audio module 670 may obtain sound through the input device 650, or may output sound through the sound output device 605 or through a headphone of an external electronic device 602 directly or wirelessly connected to the electronic device.

The sensor module 676 may detect, for example, the operating state of the electronic device 601 such as an output or a temperature, or an environmental state outside the electronic device 601 such as a user's state, and generate an electric signal or a data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The interface 677 may support one or more defined protocols to be used by the electronic device 601 directly or wirelessly connected to the external electronic device 602. In some embodiments, the interface 677 may include, for example, a high definition multimedia interface (HDMI), a universal serial bus (USB) interface, a secure digital (SEC) card interface, or an audio interface.

A connection terminal 678 may include a connector through which the electronic device 601 may be physically connected to the external electronic device 602. In some embodiments, the connection terminal 678 may include, for example, an HDMI connector, a USB connector, an SD card connector or an audio connector (such as a headphone connector).

The haptic module 679 may convert an electrical signal into, for example, a mechanical stimulus such as vibration or motion that may be perceived by the user through a tactile sensation or a kinesthetic sensation. In some embodiments, the haptic module 679 may include, for example, a motor, a piezoelectric element or an electrical stimulator.

The camera module 680 may capture still or motion images. In some embodiments, the camera module 680 may include one or more lenses, an image sensor, an image signal processor, a flash, and the like.

The power management module 688 may manage the power supplied to the electronic device 601. The power management module may be implemented, for example, as at least part of a power management integrated circuit (PMIC).

The battery 689 may provide power to at least one component of the electronic device 601. According to an embodiment, the battery 689 may include, for example, a non-rechargeable primary battery, a rechargeable secondary battery or a fuel cell.

The communication module 690 may support setting of a direct communication channel or a wireless communication channel between the electronic device 601 and an external electronic device such as, for example, the external electronic device 602, the external electronic device 604 or the server 608, and perform the communication through the set communication channels.

The communication module 690 may operate independently of the processor 620, and may include one or more communication processors that support direct communication or wireless communication.

In some embodiments, the communication module 690 may include a wireless communication module 692, such as, for example, a cellular communication module, a short range radio communication module or a global navigation satellite device (GNSS) communication module, or a wired communication module 694 such as, for example, a local area network (LAN) communication module or a power line communication (PLC) module.

The corresponding communication module among these communication modules may communicate with an external electronic device through a first network 698 such as, for example, Bluetooth™, Wi-Fi (Wireless-fidelity) direct or standard of the Infrared Data Association (IrDA) or a second network 699 such as, for example, a mobile communication network, an Internet or a long-distance communication network.

These various types of communication modules may be implemented as, for example, a single component, or may be implemented as a plurality of components separated from each other. The wireless communication module 692 may identify and authenticate the electronic device 601 inside the communication network such as the first network 698 or the second network 699, using the subscriber information stored in the subscriber identification module 696. The subscriber information may be in the form of a standard, such as, for example, the international mobile subscriber identity (IMSI) standard. In some embodiments, the communication module 690 may be implemented as control device 10 of FIG. 2.

The antenna module 697 may transmit or receive signals or power to or from the outside of the electronic device 601. In some embodiments, the antenna module 697 may include one or more antennas, and at least one antenna suitable for the communication scheme used inside the communication network, such as the first network 698 or the second network 699 may be selected from this by the communication module 690. This allows the signal or power to be transmitted or received between the communication module and the external electronic device through at least one antenna selected.

At least some of the above components are interconnected, and signals may communicate between such components through an inter-peripheral communication scheme such as, for example, a bus, a general purpose input and output (GPIO), a serial peripheral interface (SPI), a mobile industry processor interface (MIPI).

In some embodiments, the command or data may be transmitted or received between the electronic device 601 and the external electronic device 604 connected to the second network 699. Each of the external electronic device 602 and external electronic device 604 may be the device of the same type as or different type from the electronic device 601. All or part of the operations to be performed on the electronic device 601 may be performed on one or more of the external electronic device 602, external electronic device 604 or server 608. For example, all or part of the operations to be performed on the electronic device 601 may be performed on one or more of the external electronic device 602, external electronic device 604 or server 408.

For example, if an electronic device 601 needs to perform a function or service automatically or in response to a request from a user or other device, the electronic device 601 performing that function or service may alternately or additionally ask one or more external electronic devices to perform at least a part of the function or service. One or more external electronic devices that have received a request may perform at least a part of the requested function or service or additional functions or additional services related to the request, and transfer the result of the execution to the electronic device 601. The electronic device 601 provides the result as at least a part of the response to the request with or without further processing of the result. For this purpose, for example, cloud computing, distributed computing or client-server computing technologies may be used.

Although the embodiments of the present disclosure have been described with reference to the accompanying drawings, it will be apparent to those skilled in the art that the present disclosure can be manufactured in various forms without being limited to the above-described embodiments and can be embodied in other specific forms without departing from technical spirits and essential characteristics of the present disclosure. Thus, the above embodiments are to be considered in all respects as illustrative and not restrictive.

What is claimed is:

1. A control device comprising:
a plurality of processor clusters including a first processor cluster and a second processor cluster; and
a controller including memory device, wherein the controller is configured to,
generate a first virtual machine executed by the first processor cluster and a second virtual machine different from the first virtual machine executed by the second processor cluster,
switch the control device between operating in a normal mode, a sleep mode, and an idle discontinuous reception (DRX) mode in response to instructions from the controller such that,
wherein, when the controller instructs the plurality of processor clusters to operate in the normal mode, a first operation is performed on the first processor cluster by using the first virtual machine and a second operation different from the first operation is performed on the second processor cluster by using the second virtual machine,
wherein, when the controller instructs the plurality of processor clusters to switch from the normal mode to the sleep mode, the second operation on the second processor cluster is stopped by a suspend operation for the second virtual machine and data for the second virtual machine is stored in the memory device, the first operation on the first processor cluster is stopped by a suspend operation for the first virtual machine after stopping the second operation and data for the first virtual machine is stored in the memory device and an authority to perform a resume operation is assigned to the first processor cluster,
wherein, when the controller instructs the plurality of processor clusters to switch from the sleep mode to the idle DRX mode, the second operation on the second processor cluster is performed by a resume operation for the second virtual machine while the first operation on the first processor cluster remains stopped by the suspend operation for the first virtual machine, and
the authority to perform the resume operation is transferred from the first processor cluster to the second processor cluster by a resume domain manager (RDM) included in a hypervisor performing a domain change and the first processor cluster transmitting, while operating in the sleep mode with authority to perform the resume operation, a kernel level SOFT IRQ to the second processor cluster as a resume signal to instruct the second processor cluster to spin up the second virtual machine on the second processor cluster and take the authority to perform the resume operation from the first processor cluster, the second processor cluster being associated with communication with an external device.

2. The control device of claim 1, wherein the second operation is performed based on a periodic current signal after the resume operation for the second virtual machine.

3. The control device of claim 2, wherein in response to a resume interrupt from the external device, the hypervisor is configured to resume the first virtual machine by using the data for the first virtual machine from the memory device and the first operation is performed by a resume operation for the first virtual machine.

4. The control device of claim 2, wherein in response to not receiving a resume interrupt from the external device, the second operation is stopped by the suspend operation for the second virtual machine.

5. The control device of claim 1, wherein the first processor cluster includes a first sub-processor and a second sub-processor different from the first sub-processor, the second processor cluster includes a third sub-processor and a fourth sub-processor different from the third sub-processor, the first operation is performed by using the first virtual machine on the first and second sub-processors, the second operation is performed by using the second virtual machine on the third and fourth sub-processors.

6. The control device of claim 5, wherein the hypervisor is configured to perform the resume operation for the second virtual machine in response to the resume signal.

7. The control device of claim 6, wherein the third sub-processor is configured to provide a suspend signal to the first sub-processor through the SOFT IRQ, and the hypervisor is configured to perform a suspend operation for the second virtual machine in response to the suspend signal.

8. The control device of claim 6, wherein the third sub-processor is configured to provide the resume signal to the first sub-processor through the SOFT IRQ, and the hypervisor is configured to perform a resume operation for the first virtual machine in response to the resume signal.

9. The control device of claim 5, wherein the first and second sub-processors operate as an application processor, and the third and fourth sub-processors operate as a communication processor.

10. The control device of claim 1, wherein the control device is configured to generate the first and second virtual machines by using the hypervisor stored in the memory device.

11. The control device of claim 10, wherein the first processor cluster includes a first sub-processor and a second sub-processor different from the first sub-processor, the second processor cluster includes a third sub-processor and a fourth sub-processor different from the third sub-processor, the first operation is performed by using the first virtual machine on the first and second sub-processors, the second operation is performed by using the second virtual machine on the third and fourth sub-processors.

12. The control device of claim 1, wherein the memory device is configured to power on to store data for the first virtual machine and data for the second virtual machine while the first operation and the second operation are being stopped.

13. A system on chip comprising:

a controller configured to generate a first virtual machine and a second virtual machine different from the first virtual machine;

a first processor cluster configured to execute the first virtual machine; and a second processor cluster configured to execute the second virtual machine, wherein the first and second processor clusters are configured to switch between operating in a normal mode, a sleep mode, and an idle discontinuous reception (DRX) mode in response to instructions from the controller such that, in the normal mode, the first processor cluster is configured to perform a first operation by using the first virtual machine and the second processor cluster is configured to perform a second operation different from the first operation by using the second virtual machine, in the sleep mode, a suspend operation is performed on the first virtual machine and a suspend operation is performed on the second virtual machine such that the first processor cluster is configured to not perform the first operation and the second processor cluster is configured to not perform the second operation, in the idle DRX mode, the second virtual machine is resumed through execution of a resume operation while the suspend operation is maintained on the first virtual machine such that the first processor cluster is configured to not perform the first operation while the second processor cluster performs the second operation, wherein an authority to perform the resume operation is assigned to the first processor cluster in the sleep mode, and authority to perform the resume operation is transferred from the first processor cluster to the second processor cluster in the idle DRX mode by a resume domain manager (RDM) included in a hypervisor performing a domain change and the first processor cluster transmitting, while operating in the sleep mode with the authority to perform the resume operation, a kernel level SOFT IRQ to the second processor cluster as a resume signal to instruct the second processor cluster to spin up the second virtual machine on the second processor cluster and take the authority to perform the resume operation from the first processor cluster, the second processor cluster being associated with communication with an external device.

14. The system on chip of claim 13, wherein a first processor of the first processor cluster is configured to provide the resume signal to a second processor of the second processor cluster through the SOFT IRQ to switch the sleep mode to the idle DRX mode.

15. The system on chip of claim 14, wherein the second processor is configured to provide a suspend signal to the first processor through the SOFT IRQ to switch the idle DRX mode to the sleep mode.

16. The system on chip of claim 14, wherein the second processor is configured to provide a resume signal to the first processor through the SOFT IRQ to switch the idle DRX mode to the normal mode.

17. The system on chip of claim 13, wherein the first processor cluster is configured to power on in the normal mode and powered off in the sleep mode and the idle DRX mode, and the second processor cluster is configured to power on in the normal mode and the idle DRX mode and power off in the sleep mode.

18. An electronic device comprising:

a control device including, a controller including a memory device, and first and second processor clusters wherein the control device is configured to, generate a first virtual machine on the first processor cluster and a second virtual machine on the second processor cluster, which are different from each other, by using a hypervisor stored in the memory device of the controller, switch the first and second processor clusters between operating in a normal mode, a sleep mode, and an idle discontinuous reception (DRX) mode in response to instructions from the controller such that, when the controller instructs the first and second processor clusters to switch from the sleep mode to the idle DRX mode, the control device is configured to perform a suspend operation on the first virtual machine and a resume operation on the second virtual machine such that a control operation is stopped on the first virtual machine and the first processor cluster, communication with an external device is resumed on the second virtual machine and the second processor cluster and an authority to perform the resume operation is transferred from the first processor cluster to the second processor cluster by a resume domain manager (RDM) included in the hypervisor performing a domain change and a kernel level interrupt being transmitted to the second processor cluster as a resume signal to instruct the second processor cluster to spin up the second virtual machine on the second processor cluster and take the authority to perform the resume operation from the first processor cluster, when the controller instructs the first and second processor clusters to switch from the normal mode to the sleep mode, the control device is configured to perform a suspend operation on the second virtual machine and the suspend operation on the first virtual machine, and assign the authority to perform the resume operation to the first processor cluster, perform the control operation by using the first virtual machine and the first processor cluster in response to an interrupt from the external device, and switch from the idle DRX mode to the normal mode.

19. The electronic device of claim 18, wherein the control device is further configured to not perform communication with the external device by using the second virtual machine and the second processor cluster when the interrupt is not received from the external device, and switch the idle discontinuous reception (DRX) mode to the sleep mode.

20. The electronic device of claim 19, wherein, in the sleep mode, the first and second processor clusters are configured to power off and the memory device is configured to power on.

* * * * *